US012552030B2

(12) United States Patent
Shaw et al.

(10) Patent No.: US 12,552,030 B2
(45) Date of Patent: Feb. 17, 2026

(54) SYSTEMS AND METHODS FOR GRASPING AND PLACING MULTIPLE OBJECTS WITH A ROBOTIC GRIPPER

(71) Applicant: Boston Dynamics, Inc., Waltham, MA (US)

(72) Inventors: Samuel Shaw, Somerville, MA (US); Colin Snow, Sharon, MA (US); Scott Gilroy, Waltham, MA (US); Logan Tutt, Cambridge, MA (US); Kyle Edelberg, Claremont, CA (US); Neil Neville, Waltham, MA (US)

(73) Assignee: Boston Dynamics, Inc., Waltham, MA (US)

( * ) Notice: Subject to any disclaimer, the term of this patent is extended or adjusted under 35 U.S.C. 154(b) by 114 days.

(21) Appl. No.: 18/545,239

(22) Filed: Dec. 19, 2023

(65) Prior Publication Data

US 2024/0300109 A1 Sep. 12, 2024

Related U.S. Application Data

(60) Provisional application No. 63/583,941, filed on Sep. 20, 2023, provisional application No. 63/451,163, filed on Mar. 9, 2023.

(51) Int. Cl.
*B25J 9/16* (2006.01)
*B25J 15/06* (2006.01)

(52) U.S. Cl.
CPC ......... *B25J 9/1669* (2013.01); *B25J 15/0616* (2013.01)

(58) Field of Classification Search
CPC .... B25J 9/1669; B25J 15/0616; B25J 9/1612; B65G 59/04; G05B 2219/39557; G05B 2219/39558; G05B 2219/40053

(Continued)

(56) References Cited

U.S. PATENT DOCUMENTS 4,692,876 A * 9/1987 Tenma ................... G06Q 10/08
901/7
9,205,558 B1 * 12/2015 Zevenbergen ......... B25J 9/1664
(Continued)

FOREIGN PATENT DOCUMENTS

WO 2016010968 A1 1/2016

OTHER PUBLICATIONS

Fontanelli et al; A Reconfigurable Gripper for Robotic Autonomous Depalletizing in Supermarket Logistics; 2020; IEEE Robotics and Automation Letters, vol. 5, No. 3, Jul. 2020; Digital Object Identifier 10.1109/LRA.2020.3003283 (Year: 2020).*

(Continued)

*Primary Examiner* — Jaime Figueroa
(74) *Attorney, Agent, or Firm* — Pierce Atwood LLP

(57) ABSTRACT

A method of grasping and/or placing multiple objects by a gripper of a mobile robot. The multi-grasp method includes determining one or more candidate groups of objects to grasp by the suction-based gripper of the mobile robot, each of the one or more candidate groups of objects including a plurality of objects, determining a grasp quality score for each of the one or more candidate groups of objects, and grasping, by the suction-based gripper of the mobile robot, all objects in a candidate group of objects based, at least in part, on the grasp quality score. The multi-place method includes determining an allowed width associated with the conveyor, selecting a multi-place technique based, at least in part, on the allowed width and a dimension of the multiple grasped objects, and controlling the mobile robot to place the multiple grasped objects on the conveyor based on the selected multi-place technique.

20 Claims, 17 Drawing Sheets

(58) Field of Classification Search
USPC .............. 700/245–264; 318/568.11–568.25
See application file for complete search history.

(56) References Cited

U.S. PATENT DOCUMENTS

| | | | | |
|---|---|---|---|---|
| 9,333,649 | B1* | 5/2016 | Bradski | G06V 20/10 |
| 9,669,543 | B1* | 6/2017 | Stubbs | B25J 9/1612 |
| 10,189,641 | B2* | 1/2019 | Hognaland | G06Q 30/0201 |
| 10,919,151 | B1* | 2/2021 | Marchese | B65G 1/1373 |
| 11,235,458 | B2* | 2/2022 | Chitta | B25J 9/1612 |
| 11,312,581 | B2* | 4/2022 | Huang | B25J 9/163 |
| 11,407,103 | B2* | 8/2022 | Saunders | B25J 9/1651 |
| 12,251,837 | B2* | 3/2025 | Saunders | B25J 19/02 |
| 2016/0167228 | A1* | 6/2016 | Wellman | B25J 9/1602 901/3 |
| 2017/0305694 | A1* | 10/2017 | McMurrough | G06T 17/10 |
| 2019/0071261 | A1* | 3/2019 | Wertenberger | B25J 9/1697 |
| 2019/0389062 | A1* | 12/2019 | Truebenbach | G05B 19/4155 |
| 2020/0047331 | A1* | 2/2020 | Chitta | B25J 15/0683 |
| 2020/0147804 | A1* | 5/2020 | Sugiyama | G06T 7/73 |
| 2020/0316782 | A1* | 10/2020 | Chavez | B25J 9/1697 |
| 2020/0331709 | A1* | 10/2020 | Huang | B65G 47/905 |
| 2020/0346792 | A1* | 11/2020 | Curhan | B25J 15/10 |
| 2020/0398441 | A1* | 12/2020 | Marchese | B25J 9/1669 |
| 2021/0032034 | A1* | 2/2021 | Kalouche | B25J 9/1612 |
| 2021/0178579 | A1* | 6/2021 | Saunders | B25J 19/02 |
| 2021/0354297 | A1* | 11/2021 | Deng | B25J 19/023 |
| 2022/0111519 | A1* | 4/2022 | Stanton | B25J 15/0061 |
| 2022/0194248 | A1* | 6/2022 | Kalouche | B65G 1/065 |
| 2022/0226866 | A1* | 7/2022 | Taylor | B07C 5/36 |
| 2022/0297312 | A1* | 9/2022 | Baek | B25J 15/0666 |
| 2022/0371189 | A1* | 11/2022 | Saunders | B25J 9/1651 |
| 2023/0092900 | A1* | 3/2023 | Lovett | B25J 9/103 700/245 |
| 2023/0109294 | A1* | 4/2023 | Kim | B25J 13/06 700/253 |
| 2023/0182318 | A1* | 6/2023 | Geating | B25J 13/082 700/258 |
| 2023/0191608 | A1* | 6/2023 | Horowitz | B25J 9/163 700/245 |
| 2024/0149460 | A1* | 5/2024 | Matl | B25J 9/1679 |

OTHER PUBLICATIONS

Hudoklin et al; Vacuum Suction Cup Modeling for Evaluation of Sealing and Real-Time Simulation; 2022; IEEE Robotics and Automation Letters, vol. 7, No. 2, Apr. 2022; Digital Object Identifier 10.1109/LRA.2022.3145509 (Year: 2022).*

International Search Report and Written Opinion from the International Searching Authority for Application No. PCT/US2023/085080, dated Jun. 19, 2024, 23 pages.

Invitation to Pay Additional Fees and Annex to Form PCT/ISA/206 Results of Partial International Search Report from the International Searching Authority for Application No. PCT/US2023/085080, dated Apr. 29, 2024, 16 pages.

* cited by examiner

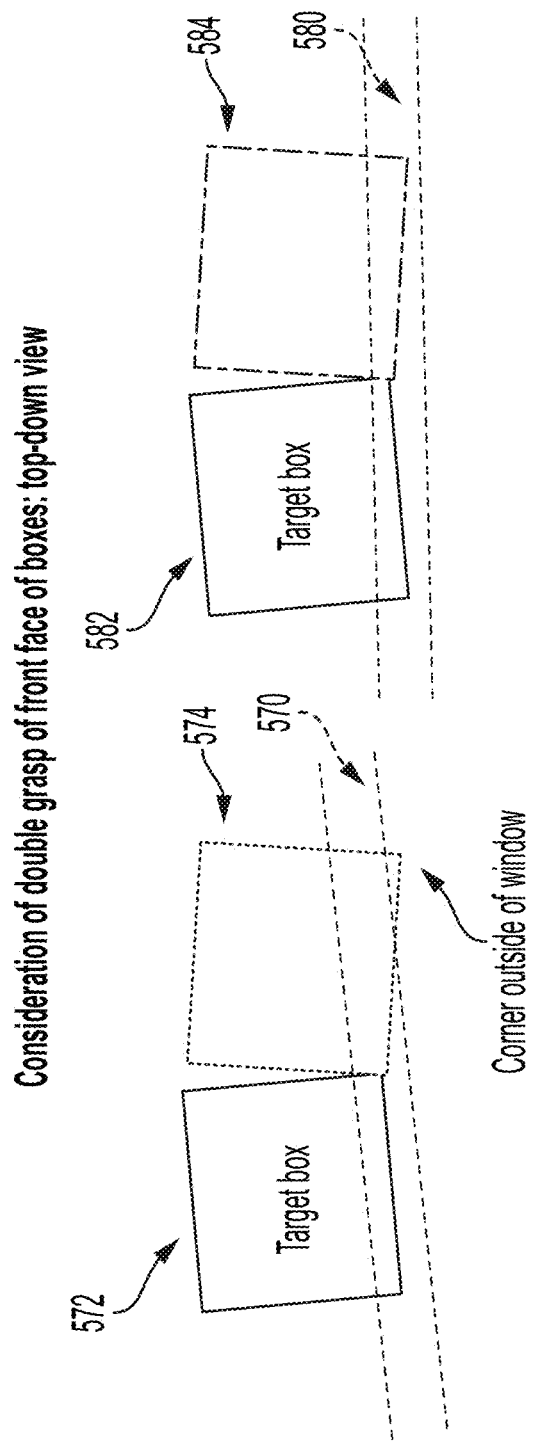

Desired extension is greater than limit, use limit

SYSTEMS AND METHODS FOR GRASPING AND PLACING MULTIPLE OBJECTS WITH A ROBOTIC GRIPPER

CROSS-REFERENCE TO RELATED APPLICATIONS

This application claims the benefit under 35 U.S.C. § 119(e) to U.S. Provisional Patent Application No. 63/451,163, filed Mar. 9, 2023, and titled, "SYSTEMS AND METHODS FOR GRASPING AND PLACING MULTIPLE OBJECTS WITH A ROBOTIC GRIPPER," and U.S. Provisional Patent Application No. 63/583,941, filed Sep. 20, 2023, and titled, "SYSTEMS AND METHODS FOR GRASPING AND PLACING MULTIPLE OBJECTS WITH A ROBOTIC GRIPPER," the entire contents of each of which is incorporated by reference herein.

FIELD OF THE INVENTION

This disclosure relates to techniques for grasping and placing multiple objects with a robotic gripper.

BACKGROUND

A robot is generally defined as a reprogrammable and multifunctional manipulator designed to move material, parts, tools, and/or specialized devices (e.g., via variable programmed motions) for performing tasks. Robots may include manipulators that are physically anchored (e.g., industrial robotic arms), mobile devices that move throughout an environment (e.g., using legs, wheels, or traction-based mechanisms), or some combination of one or more manipulators and one or more mobile devices. Robots are currently used in a variety of industries, including, for example, manufacturing, warehouse logistics, transportation, hazardous environments, exploration, and healthcare.

SUMMARY

Robots may be configured to grasp objects (e.g., boxes) and move them from one location to another using, for example, a robotic arm with a vacuum-based gripper attached thereto. For instance, the robotic arm may be positioned such that one or more suction cups of the gripper are in contact with (or are near) a face of an object to be grasped. An on-board vacuum system may then be activated to use suction to adhere the object to the gripper. In some scenarios the robot may be capable of grasping and moving multiple objects simultaneously, given suitable size and weight of the objects relative to the size and capabilities of the gripper. Grasping and placing more than one object in a single pick-place cycle may have benefits from both speed and robustness perspectives.

In a single-pick operation, the robot may determine a target object to grasp from among a plurality of objects within reach of the gripper, and select a gripper position prior to securely grasping the object prior to moving the object to another location. In a "multi-pick" operation in which multiple objects are simultaneously grasped by the gripper, some additional challenges may arise. Such challenges may include, but are not limited to, selecting which group of objects may be grasped together and determining a gripper pose to securely grasp and move the group of objects to another location. Similar to a single-pick operation, for a multi-pick operation, obstacles in the environment where the object is located (e.g., a wall or ceiling of an enclosure such as a truck) may prevent access to one or more of the faces of the objects to be grasped. Additionally, even when there are multiple feasible grasps of a group of objects, some grasps may be more secure than others. Ensuring a secure grasp on all objects in the group may be important for moving the group of objects efficiently and without damage (e.g., from dropping one or more of the objects due to loss of grasp).

Some embodiments are directed to techniques for determining which objects in a stack of objects may be grasped together as a group of objects, and evaluating high-quality feasible grasps of the candidate groups of objects to extract the group of objects from the stack without damage. A physical model of gripper-object interactions can be used to evaluate the quality of the grasp of each of the objects in a selected group before the multi-pick grasp is attempted by the robot. Multiple candidate grasps can be considered, such that if one grasp fails a collision check or is enacted on a part of the object with poor integrity, other (lower ranking) grasping options are available to try. Such fallback grasp options help to limit the need for grasping-related interventions (e.g., by humans), increasing the throughput of pick and place operations of the robot. Additionally, by selecting higher quality grasps, the number of objects dropped can be reduced, leading to fewer damaged products and overall faster object movement by the robot.

Objects that are grasped by the robot may be moved to a new location where they are placed on a conveyor, pallet or other structure. When the grasped object is to be placed on a conveyor in a single-pick operation, placing the single object grasped by the robot on the conveyor may preferably be achieved by placing the longest dimension of the object along the conveyor travel direction to prevent the object from falling off the side of the conveyor. When multiple objects are simultaneously grasped by the robot in a multi-pick operation, it may be preferable that the objects are also placed on the conveyor with their longest dimension aligned with the conveyor travel direction. However, the timing and placement of each of the objects in the group may also need to be coordinated to ensure that the objects are suitably spaced on the conveyor along the conveyor travel direction while remaining a suitable distance from the sides of the conveyor. Accordingly, some embodiments are directed to techniques for placing multiple simultaneously-grasped objects on a conveyor or other structure by executing an appropriate placement technique that places the objects at a desired location.

In some embodiments the invention features a method of grasping multiple objects by a suction-based gripper of a mobile robot. The method includes determining, by a computing device, one or more candidate groups of objects to grasp by the suction-based gripper of the mobile robot, each of the one or more candidate groups of objects including a plurality of objects, determining, by the computing device, a grasp quality score for each of the candidate groups of objects, and grasping, by the suction-based gripper of the mobile robot, all objects in the candidate group of objects having a best grasp quality score.

In one aspect, the method further includes determining, by the computing device, a target object to grasp by the suction-based gripper of the mobile robot, and each of the one or more candidate groups of objects includes the target object. In another aspect, a plurality of non-target objects are arranged in a vicinity of the target object, and wherein determining one or more candidate groups of objects to grasp by the suction-based gripper of the mobile robot includes determining, by the computing device, to exclude a non-target object from a candidate group when the non-target object satisfies at least one criterion, and including in the one or more candidate groups only non-target objects that are not excluded. In another aspect, the at least one criterion includes a face of the non-target object being misaligned by a threshold amount from a face of the target object. In another aspect, the method further includes defining an alignment window based on the face of the target object and determining the non-target object is misaligned by a threshold amount from the face of the target object when at least one corner of the face of the non-target object is outside of the alignment window. In another aspect, defining the alignment window is further based on the face of the non-target object. In another aspect, the at least one criterion includes at least one dimension of the non-target object being above a threshold dimension. In another aspect, the at least one criterion includes at least one dimension of the non-target object being unknown. In another aspect, the at least one criterion includes the non-target object having a different longest dimension than a longest dimension of the target object. In another aspect, the at least one criterion includes the non-target object having a dependency on at least one other non-target object determined to be excluded from a candidate group.

In another aspect, determining a grasp quality score for each of the candidate groups of objects includes for each object in the candidate group, using a physical model of object-gripper interaction to evaluate a grasp quality of the object-gripper interaction, and determining the grasp quality score based on the grasp quality determined for each of the objects in the candidate group.

In another aspect, the method further includes determining, by the computing device, for each object in the grasped group of objects, a grasp quality, and releasing one or more objects from the suction-based gripper based, at least in part, on the grasp quality for at least one object being below a threshold grasp quality. In another aspect, releasing one or more objects from the suction-based gripper comprises releasing each object having a grasp quality below the threshold grasp quality. In another aspect, releasing one or more objects from the suction-based gripper comprises releasing a first object having a grasp quality above the threshold grasp quality and being located adjacent to a second object having a grasp quality below the threshold grasp quality.

In another aspect, the method further includes determining, by the computing device, a depth of the plurality of objects within each of the one or more candidate groups of objects, and grasping all objects in the candidate group of objects is further based, at least in part, on the depth determined for each of the one or more candidate groups of objects. In another aspect, determining the depth of the plurality of objects within each of the one or more candidate groups of objects includes modeling dependencies between objects in a stack of objects as a directed acyclic graph, wherein each node of the acyclic graph represents an object in the stack and each directed edge between nodes in the acyclic graph represents an amount of physical blocking between the nodes, determining the depth of each of the plurality of objects in a candidate group of objects based as a longest path between an object with no blocking by other objects in the stack and the node in the acyclic graph representing the object, and determining the depth of the plurality of objects within a candidate group of objects based on a sum of the depths of each of the objects in the candidate group. In another aspect, the method further includes determining, by the computing device, an object placement property for at least one object of the plurality of objects within each of the one or more candidate groups of objects, and grasping all objects in the candidate group of objects is further based, at least in part, on the object placement property determined for each of the one or more candidate groups of objects. In another aspect, the object placement property is an estimated drop height for the object. In another aspect, the suction-based gripper includes a plurality of suction cups, and the method further includes assigning a seal confidence to each of the plurality of suction cups, and controlling operation of each of the plurality of suction cups based, at least in part, on the assigned seal confidence for the suction cup. In another aspect, controlling operation of each of the plurality of suction cups comprises controlling a leak detection process and/or a cup retrying process. In another aspect, assigning a seal confidence to each of the plurality of suction cups includes assigning a first confidence value to a suction cup when an inner diameter but not an outer diameter of the suction cup is within a face surface of an object to be grasped, and assigning a second confidence value to the suction cup when both the inner diameter and the outer diameter of the suction cup is within the face surface of the object to be grasped.

In some embodiments, the invention features a method of grasping multiple objects by a suction-based gripper of a mobile robot. The method includes determining, by a computing device, one or more candidate groups of objects to grasp by the suction-based gripper of the mobile robot, each of the one or more candidate groups of objects including a plurality of objects, determining, by the computing device, a grasp quality score for each of the one or more candidate groups of objects, and grasping, by the suction-based gripper of the mobile robot, all objects in the candidate group of objects based, at least in part, on the grasp quality score determined for each of the one or more candidate groups of objects.

In some embodiments, the invention features a mobile robot. The mobile robot includes a suction-based gripper and at least one computing device. The at least one computing device is programmed to determine one or more candidate groups of objects to grasp by the suction-based gripper, each of the one or more candidate groups of objects including a plurality of objects, determine a grasp quality score for each of the candidate groups of objects, and grasp, by the suction-based gripper, all objects in the candidate group of objects having a best grasp quality score.

In one aspect, the at least one computing device is further programmed to determine a target object to grasp by the suction-based gripper, and each of the one or more candidate groups of objects includes the target object. In another aspect, a plurality of non-target objects are arranged in a vicinity of the target object, and determining one or more candidate groups of objects to grasp by the suction-based gripper includes determining to exclude a non-target object from a candidate group when the non-target object satisfies at least one criterion, and including in the one or more candidate groups only non-target objects that are not excluded. In another aspect, the at least one criterion includes a face of the non-target object being misaligned by a threshold amount from a face of the target object. In another aspect, the at least one computing device is further programmed to define an alignment window based on the face of the target object, and determine the non-target object is misaligned by a threshold amount from the face of the target object when at least one corner of the face of the non-target object is outside of the alignment window. In another aspect, defining the alignment window is further based on the face of the non-target object. In another aspect, the at least one criterion includes at least one dimension of the non-target object being above a threshold dimension. In another aspect, the at least one criterion includes at least one dimension of the non-target object being unknown. In another aspect, the at least one criterion includes the non-target object having a different longest dimension than a longest dimension of the target object. In another aspect, the at least one criterion includes the non-target object having a dependency on at least one other non-target object determined to be excluded from a candidate group.

In another aspect, determining a grasp quality score for each of the candidate groups of objects includes for each object in the candidate group, using a physical model of object-gripper interaction to evaluate a grasp quality of the object-gripper interaction, and determining the grasp quality score based on the grasp quality determined for each of the objects in the candidate group.

In another aspect, the at least one computing device is further programmed to determine, for each object in the grasped group of objects, a grasp quality, and release one or more objects from the suction-based gripper based, at least in part, on the grasp quality for at least one object being below a threshold grasp quality. In another aspect, releasing one or more objects from the suction-based gripper includes releasing each object having a grasp quality below the threshold grasp quality. In another aspect, releasing one or more objects from the suction-based gripper comprises releasing a first object having a grasp quality above the threshold grasp quality and being located adjacent to a second object having a grasp quality below the threshold grasp quality.

In another aspect, the at least one computing device is further programmed to determine a depth of the plurality of objects within each of the one or more candidate groups of objects, and grasping all objects in the candidate group of objects is further based, at least in part, on the depth determined for each of the one or more candidate groups of objects. In another aspect, determining the depth of the plurality of objects within each of the one or more candidate groups of objects includes modeling dependencies between objects in a stack of objects as a directed acyclic graph, wherein each node of the acyclic graph represents an object in the stack and each directed edge between nodes in the acyclic graph represents an amount of physical blocking between the nodes, determining the depth of each of the plurality of objects in a candidate group of objects based as a longest path between an object with no blocking by other objects in the stack and the node in the acyclic graph representing the object, and determining the depth of the plurality of objects within a candidate group of objects based on a sum of the depths of each of the objects in the candidate group. In another aspect, the at least one computing device is further programmed to determine, an object placement property for at least one object of the plurality of objects within each of the one or more candidate groups of objects, and grasping all objects in the candidate group of objects is further based, at least in part, on the object placement property determined for each of the one or more candidate groups of objects. In another aspect, the object placement property is an estimated drop height for the object. In another aspect, the suction-based gripper includes a plurality of suction cups, and the at least one computing device is further programmed to assign a seal confidence to each of the plurality of suction cups, and control operation of each of the plurality of suction cups based, at least in part, on the assigned seal confidence for the suction cup. In another aspect, controlling operation of each of the plurality of suction cups comprises controlling a leak detection process and/or a cup retrying process. In another aspect, assigning a seal confidence to each of the plurality of suction cups includes assigning a first confidence value to a suction cup when an inner diameter but not an outer diameter of the suction cup is within a face surface of an object to be grasped, and assigning a second confidence value to the suction cup when both the inner diameter and the outer diameter of the suction cup is within the face surface of the object to be grasped.

In some embodiments, the invention features a mobile robot. The mobile robot includes a suction-based gripper and at least one computing device. The at least one computing device is programmed to determine one or more candidate groups of objects to grasp by the suction-based gripper, each of the one or more candidate groups of objects including a plurality of objects, determine a grasp quality score for each of the one or more candidate groups of objects; and grasp, by the suction-based gripper, all objects in the candidate group of objects based, at least in part, on the grasp quality score determined for each of the one or more candidate groups of objects.

In some embodiments, the invention features a method of placing on a conveyor multiple grasped objects simultaneously grasped by a gripper of a mobile robot. The method includes determining, by a computing device, an allowed width associated with the conveyor, selecting, by the computing device, a multi-place technique based, at least in part, on the allowed width and a dimension of the multiple grasped objects, and controlling the mobile robot to place the multiple grasped objects on the conveyor based on the selected multi-place technique.

In one aspect, selecting the multi-place technique includes determining that the dimension of the multiple grasped objects is less than the allowed width, and selecting a sweeping multi-place technique when it is determined that the dimension of the multiple grasped objects is less than the allowed width. In another aspect, the sweeping multi-place technique includes placing a first object of the multiple grasped objects on the conveyor, controlling the gripper to move in a direction opposite the direction of travel of the conveyor, and placing a second object of the multiple grasped objects on the conveyor after controlling the gripper to move.

In another aspect, selecting the multi-place technique includes determining that the dimension of the multiple grasped objects is greater than the allowed width, and selecting a side-by-side multi-place technique when it is determined that the dimension of the multiple grasped objects is greater than the allowed width. In another aspect, the side-by-side multi-place technique includes placing a first object of the multiple grasped objects on the conveyor, controlling the gripper to move in a direction opposite the direction of travel of the conveyor and a direction perpendicular to the direction of travel of the conveyor, and placing a second object of the multiple grasped objects on the conveyor after controlling the gripper to move. In another aspect, controlling the gripper to move in a direction opposite the direction of travel of the conveyor and a direction perpendicular to the direction of travel of the conveyor is performed in a continuous motion.

In another aspect, the gripper of the mobile robot includes individually controllable suction cups, and controlling the mobile robot to place the multiple grasped objects on the conveyor comprises turning off suction to a portion of the suction cups in accordance with the selected multi-place technique.

In another aspect, the dimension of the multiple grasped objects is a longest dimension of one of the multiple grasped objects, a default multi-place technique is a technique that places the longest dimension of the one of the multiple grasped objects along a direction of travel of the conveyor, and selecting a multi-place technique based, at least in part, on the allowed width and a dimension of the multiple grasped objects comprises selecting the default multi-place technique. In another aspect, the method further includes determining that two or more dimensions of the one of the multiple grasped objects differ by less than a threshold amount, and selecting a multi-place technique based, at least in part, on the allowed width and a dimension of the multiple grasped objects includes selecting a multi-place technique other than the default multi-place technique when it is determined that the two or more dimensions of the multiple grasped objects differ by less than the threshold amount. In another aspect, the method further includes determining that a ratio of the shortest dimension to a second shortest dimension of the one of the multiple grasped objects differ is greater than a threshold amount, and selecting a multi-place technique based, at least in part, on the allowed width and a dimension of the multiple grasped objects comprises selecting a multi-place technique other than the default multi-place technique when it is determined that the ratio of the shortest dimension to the second shortest dimension of the one of the multiple grasped objects differ is greater than the threshold amount.

In another aspect, the method further includes determining, based on one or more characteristics of the multiple grasped objects, an arm extension, and controlling the mobile robot to place the multiple grasped objects on the conveyor is further based on the determined arm extension. In another aspect, determining the arm extension is further based on an arm extension limit of the robot. In another aspect, the one or more characteristics of the multiple grasped objects includes a size and/or positioning of the multiple grasped objects. In another aspect, determining the arm extension is further based on a desired spacing of the multiple grasped objects on the conveyor. In another aspect, determining the arm extension is further based on a speed of the conveyor.

In some embodiments, the invention features a mobile robot including a suction-based gripper and at least one computing device. The at least one computing device is programmed to determine an allowed width associated with the conveyor, select a multi-place technique based, at least in part, on the allowed width and a dimension of the multiple grasped objects, and control the mobile robot to place the multiple grasped objects on the conveyor based on the selected multi-place technique.

In one aspect, selecting the multi-place technique includes determining that the dimension of the multiple grasped objects is less than the allowed width, and selecting a sweeping multi-place technique when it is determined that the dimension of the multiple grasped objects is less than the allowed width. In another aspect, the sweeping multi-place technique includes placing a first object of the multiple grasped objects on the conveyor, controlling the suction-based gripper to move in a direction opposite the direction of travel of the conveyor, and placing a second object of the multiple grasped objects on the conveyor after controlling the suction-based gripper to move.

In another aspect, selecting the multi-place technique includes determining that the dimension of the multiple grasped objects is greater than the allowed width, and selecting a side-by-side multi-place technique when it is determined that the dimension of the multiple grasped objects is greater than the allowed width. In another aspect, the side-by-side multi-place technique includes placing a first object of the multiple grasped objects on the conveyor, controlling the suction-based gripper to move in a direction opposite the direction of travel of the conveyor and a direction perpendicular to the direction of travel of the conveyor, and placing a second object of the multiple grasped objects on the conveyor after controlling the suction-based gripper to move. In another aspect, controlling the suction-based gripper to move in a direction opposite the direction of travel of the conveyor and a direction perpendicular to the direction of travel is performed in a continuous motion.

In another aspect, the suction-based gripper of the mobile robot includes individually controllable suction cups, and controlling the mobile robot to place the multiple grasped objects on the conveyor comprises turning off suction to a portion of the suction cups in accordance with the selected multi-place technique.

In another aspect, the dimension of the multiple grasped objects is a longest dimension of one of the multiple grasped objects, a default multi-place technique is a technique that places the longest dimension of the one of the multiple grasped objects along a direction of travel of the conveyor, and selecting a multi-place technique based, at least in part, on the allowed width and a dimension of the multiple grasped objects comprises selecting the default multi-place technique. In another aspect, the at least one computing device is further programmed to determine that two or more dimensions of the one of the multiple grasped objects differ by less than a threshold amount, and selecting a multi-place technique based, at least in part, on the allowed width and a dimension of the multiple grasped objects comprises selecting a multi-place technique other than the default multi-place technique when it is determined that the two or more dimensions of the multiple grasped objects differ by less than the threshold amount. In another aspect, the at least one computing device is further programmed to determine that a ratio of the shortest dimension to a second shortest dimension of the one of the multiple grasped objects differ is greater than a threshold amount, and selecting a multi-place technique based, at least in part, on the allowed width and a dimension of the multiple grasped objects comprises selecting a multi-place technique other than the default multi-place technique when it is determined that the ratio of the shortest dimension to the second shortest dimension of the one of the multiple grasped objects differ is greater than the threshold amount. In another aspect, the mobile robot further includes an arm coupled to the suction-based gripper, and the at least one computing device is further programmed to determine, based on one or more characteristics of the multiple grasped objects, an arm extension of the arm, wherein controlling the mobile robot to place the multiple grasped objects on the conveyor is further based on the determined arm extension of the arm. In another aspect, determining the arm extension is further based on an arm extension limit of the robot. In another aspect, the one or more characteristics of the multiple grasped objects includes a size and/or positioning of the multiple grasped objects. In another aspect, the arm extension is further based on a desired spacing of the multiple grasped objects on the conveyor. In another aspect, determining the arm extension is further based on a speed of the conveyor.

BRIEF DESCRIPTION OF DRAWINGS

The advantages of the invention, together with further advantages, may be better understood by referring to the following description taken in conjunction with the accompanying drawings. The drawings are not necessarily to scale, and emphasis is instead generally placed upon illustrating the principles of the invention.

FIG. 5D schematically illustrates a process for determining alignment of two objects based on an orientation of one of the objects, according to an illustrative embodiment of the invention.

FIG. 5E schematically illustrates a process for determining alignment of two objects based on an orientation of each of the objects, according to an illustrative embodiment of the invention.

DETAILED DESCRIPTION

Figure 1A:
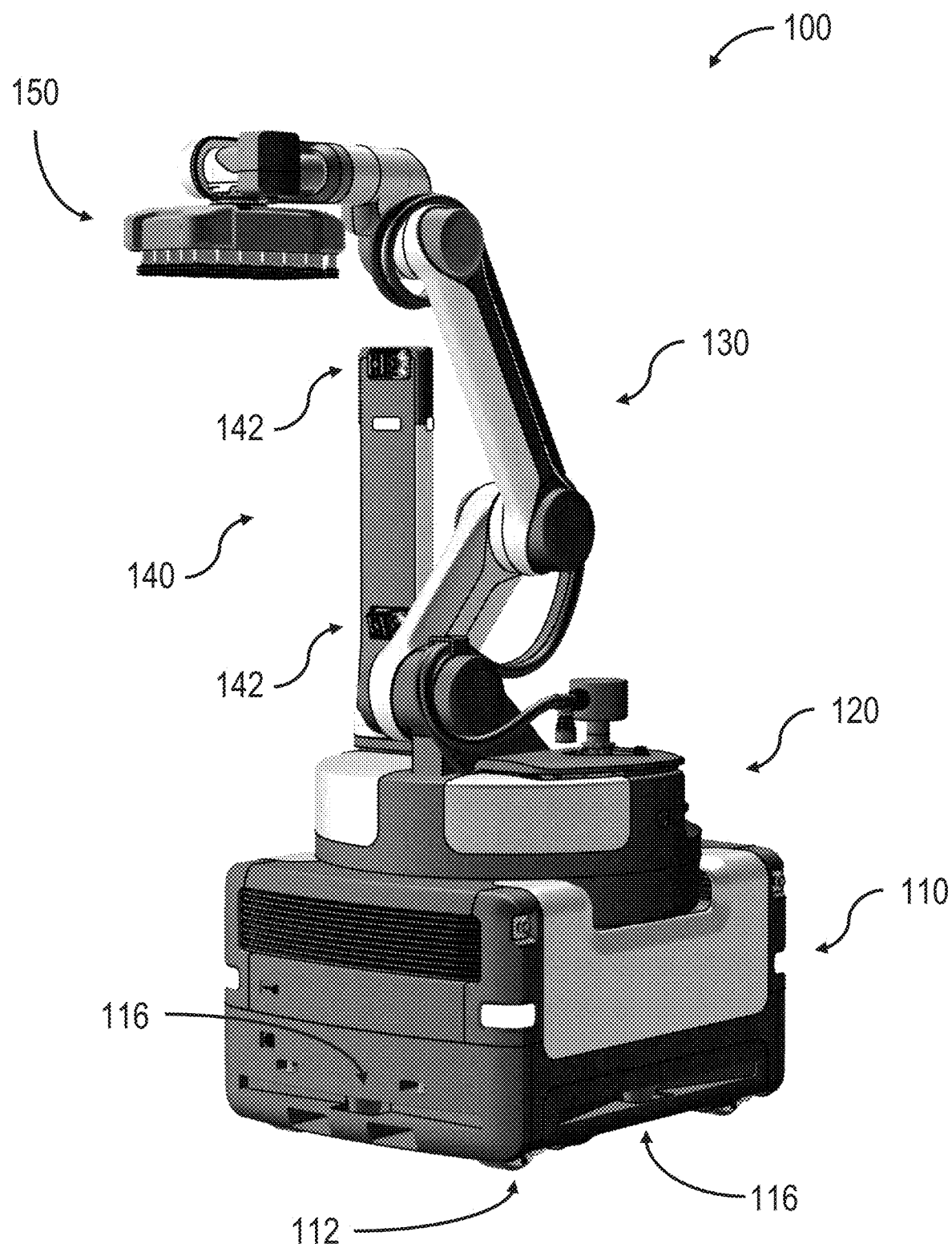
FIGS. 1A and 1B are perspective views of a robot, according to an illustrative embodiment of the invention.

Robots tasked with grasping and moving objects (e.g., boxes) from a first location (e.g., a stack of boxes inside of a truck) to a second location (e.g., a conveyor) may benefit from grasping multiple objects in a single pick-place cycle provided that the group of objects can be moved securely without damage to the objects during movement or placement. For instance, the rate at which the objects can be moved from the first location to the second location may be increased, resulting in fewer pick-place cycles. The inventors have recognized and appreciated that such multi-pick and multi-place operations present some challenges that are not present in single-pick operations in which only a single target object is grasped and placed. To this end, some embodiments of the present disclosure are directed to techniques for enabling a robot to perform multi-pick and multi-place operations.

Robots can be configured to perform a number of tasks in an environment in which they are placed. Exemplary tasks may include interacting with objects and/or elements of the environment. Notably, robots are becoming popular in warehouse and logistics operations. Before robots were introduced to such spaces, many operations were performed manually. For example, a person might manually unload boxes from a truck onto one end of a conveyor belt, and a second person at the opposite end of the conveyor belt might organize those boxes onto a pallet. The pallet might then be picked up by a forklift operated by a third person, who might drive to a storage area of the warehouse and drop the pallet for a fourth person to remove the individual boxes from the pallet and place them on shelves in a storage area. Some robotic solutions have been developed to automate many of these functions. Such robots may either be specialist robots (i.e., designed to perform a single task or a small number of related tasks) or generalist robots (i.e., designed to perform a wide variety of tasks). To date, both specialist and generalist warehouse robots have been associated with significant limitations.

For example, because a specialist robot may be designed to perform a single task (e.g., unloading boxes from a truck onto a conveyor belt), while such specialized robots may be efficient at performing their designated task, they may be unable to perform other related tasks. As a result, either a person or a separate robot (e.g., another specialist robot designed for a different task) may be needed to perform the next task(s) in the sequence. As such, a warehouse may need to invest in multiple specialized robots to perform a sequence of tasks, or may need to rely on a hybrid operation in which there are frequent robot-to-human or human-to-robot handoffs of objects.

In contrast, while a generalist robot may be designed to perform a wide variety of tasks (e.g., unloading, palletizing, transporting, depalletizing, and/or storing), such generalist robots may be unable to perform individual tasks with high enough efficiency or accuracy to warrant introduction into a highly streamlined warehouse operation. For example, while mounting an off-the-shelf robotic manipulator onto an off-the-shelf mobile robot might yield a system that could, in theory, accomplish many warehouse tasks, such a loosely integrated system may be incapable of performing complex or dynamic motions that require coordination between the manipulator and the mobile base, resulting in a combined system that is inefficient and inflexible.

Typical operation of such a system within a warehouse environment may include the mobile base and the manipulator operating sequentially and (partially or entirely) independently of each other. For example, the mobile base may first drive toward a stack of boxes with the manipulator powered down. Upon reaching the stack of boxes, the mobile base may come to a stop, and the manipulator may power up and begin manipulating the boxes as the base remains stationary. After the manipulation task is completed, the manipulator may again power down, and the mobile base may drive to another destination to perform the next task.

In such systems, the mobile base and the manipulator may be regarded as effectively two separate robots that have been joined together. Accordingly, a controller associated with the manipulator may not be configured to share information with, pass commands to, or receive commands from a separate controller associated with the mobile base. As such, such a poorly integrated mobile manipulator robot may be forced to operate both its manipulator and its base at suboptimal speeds or through suboptimal trajectories, as the two separate controllers struggle to work together. Additionally, while certain limitations arise from an engineering perspective, additional limitations must be imposed to comply with safety regulations. For example, if a safety regulation requires that a mobile manipulator must be able to be completely shut down within a certain period of time when a human enters a region within a certain distance of the robot, a loosely integrated mobile manipulator robot may not be able to act sufficiently quickly to ensure that both the manipulator and the mobile base (individually and in aggregate) do not threaten the human. To ensure that such loosely integrated systems operate within required safety constraints, such systems are forced to operate at even slower speeds or to execute even more conservative trajectories than those limited speeds and trajectories as already imposed by the engineering problem. As such, the speed and efficiency of generalist robots performing tasks in warehouse environments to date have been limited.

In view of the above, a highly integrated mobile manipulator robot with system-level mechanical design and holistic control strategies between the manipulator and the mobile base may provide certain benefits in warehouse and/or logistics operations. Such an integrated mobile manipulator robot may be able to perform complex and/or dynamic motions that are unable to be achieved by conventional, loosely integrated mobile manipulator systems. As a result, this type of robot may be well suited to perform a variety of different tasks (e.g., within a warehouse environment) with speed, agility, and efficiency.

Example Robot Overview

In this section, an overview of some components of one embodiment of a highly integrated mobile manipulator robot configured to perform a variety of tasks is provided to explain the interactions and interdependencies of various subsystems of the robot. Each of the various subsystems, as well as control strategies for operating the subsystems, are described in further detail in the following sections.

Figure 1B:
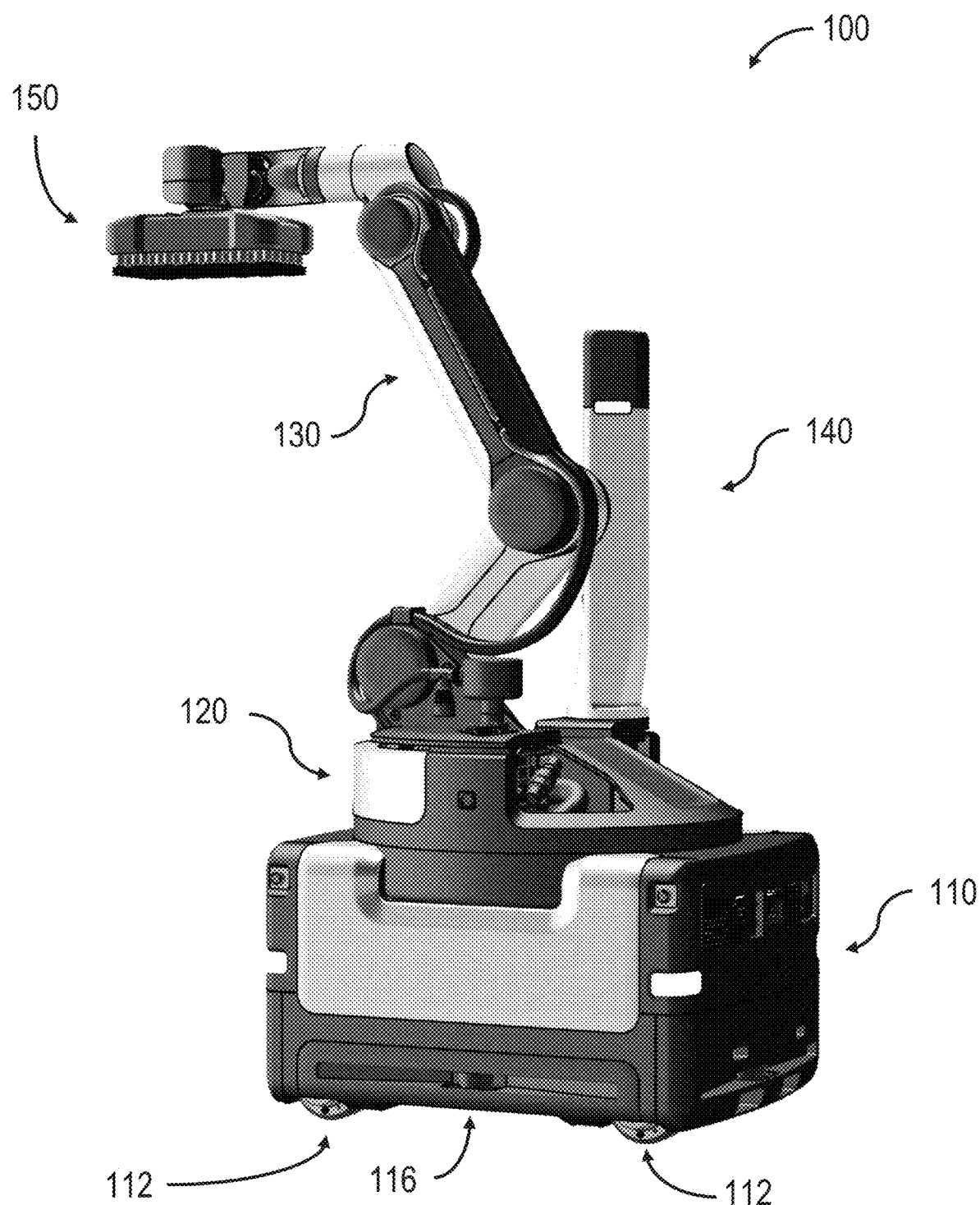

FIGS. 1A and 1B are perspective views of a robot 100, according to an illustrative embodiment of the invention. The robot 100 includes a mobile base 110 and a robotic arm 130. The mobile base 110 includes an omnidirectional drive system that enables the mobile base to translate in any direction within a horizontal plane as well as rotate about a vertical axis perpendicular to the plane. Each wheel 112 of the mobile base 110 is independently steerable and independently drivable. The mobile base 110 additionally includes a number of distance sensors 116 that assist the robot 100 in safely moving about its environment. The robotic arm 130 is a 6 degree of freedom (6-DOF) robotic arm including three pitch joints and a 3-DOF wrist. An end effector 150 is disposed at the distal end of the robotic arm 130. The robotic arm 130 is operatively coupled to the mobile base 110 via a turntable 120, which is configured to rotate relative to the mobile base 110. In addition to the robotic arm 130, a perception mast 140 is also coupled to the turntable 120, such that rotation of the turntable 120 relative to the mobile base 110 rotates both the robotic arm 130 and the perception mast 140. The robotic arm 130 is kinematically constrained to avoid collision with the perception mast 140. The perception mast 140 is additionally configured to rotate relative to the turntable 120, and includes a number of perception modules 142 configured to gather information about one or more objects in the robot's environment. The integrated structure and system-level design of the robot 100 enable fast and efficient operation in a number of different applications, some of which are provided below as examples.

Figure 2A:
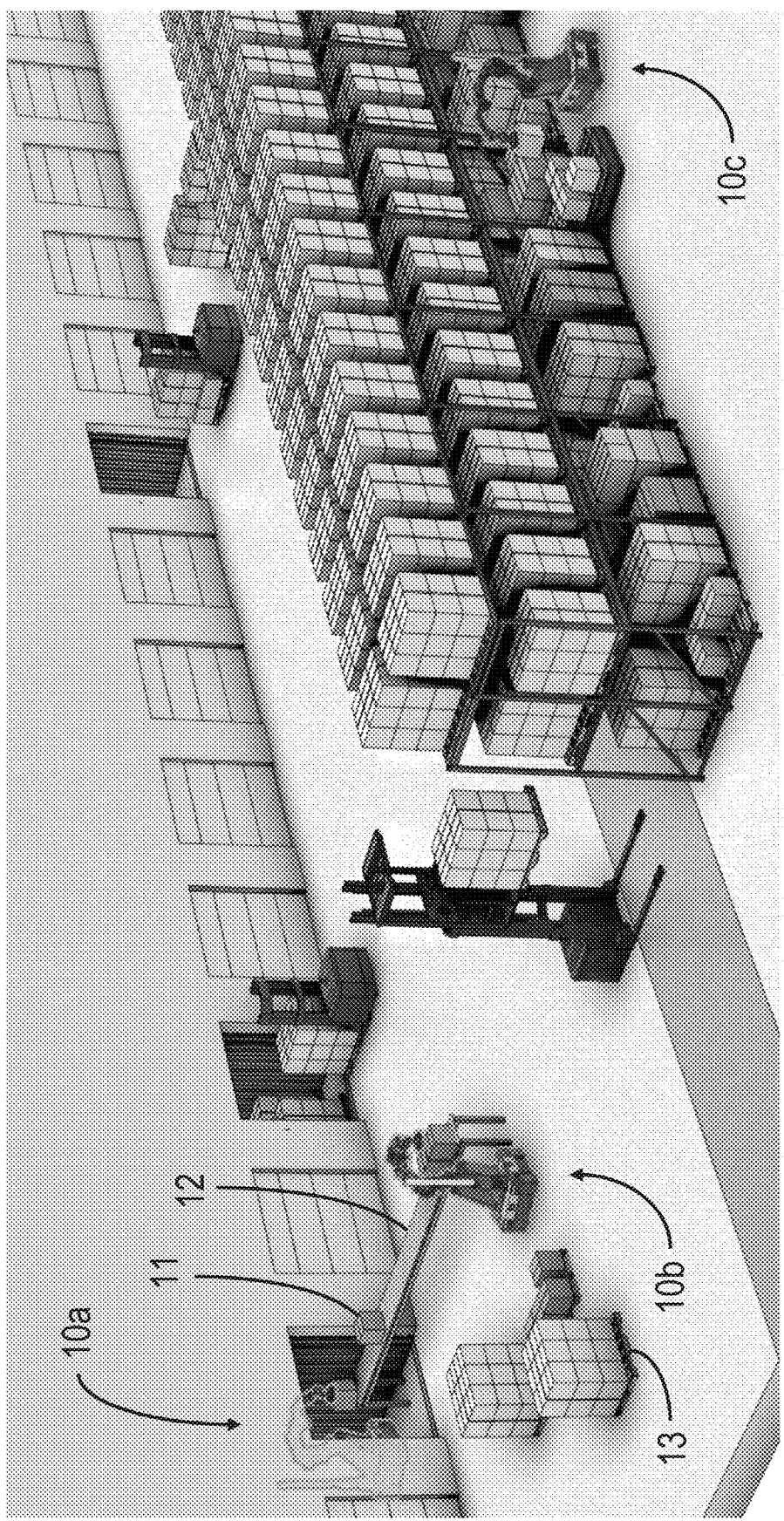
FIG. 2A depicts robots performing different tasks within a warehouse environment, according to an illustrative embodiment of the invention.

FIG. 2A depicts robots 10a, 10b, and 10c performing different tasks within a warehouse environment. A first robot 10a is inside a truck (or a container), moving boxes 11 from a stack within the truck onto a conveyor belt 12 (this particular task will be discussed in greater detail below in reference to FIG. 2B). At the opposite end of the conveyor belt 12, a second robot 10b organizes the boxes 11 onto a pallet 13. In a separate area of the warehouse, a third robot 10c picks boxes from shelving to build an order on a pallet (this particular task will be discussed in greater detail below in reference to FIG. 2C). The robots 10a, 10b, and 10c can be different instances of the same robot or similar robots. Accordingly, the robots described herein may be understood as specialized multi-purpose robots, in that they are designed to perform specific tasks accurately and efficiently, but are not limited to only one or a small number of tasks.

Figure 2B:
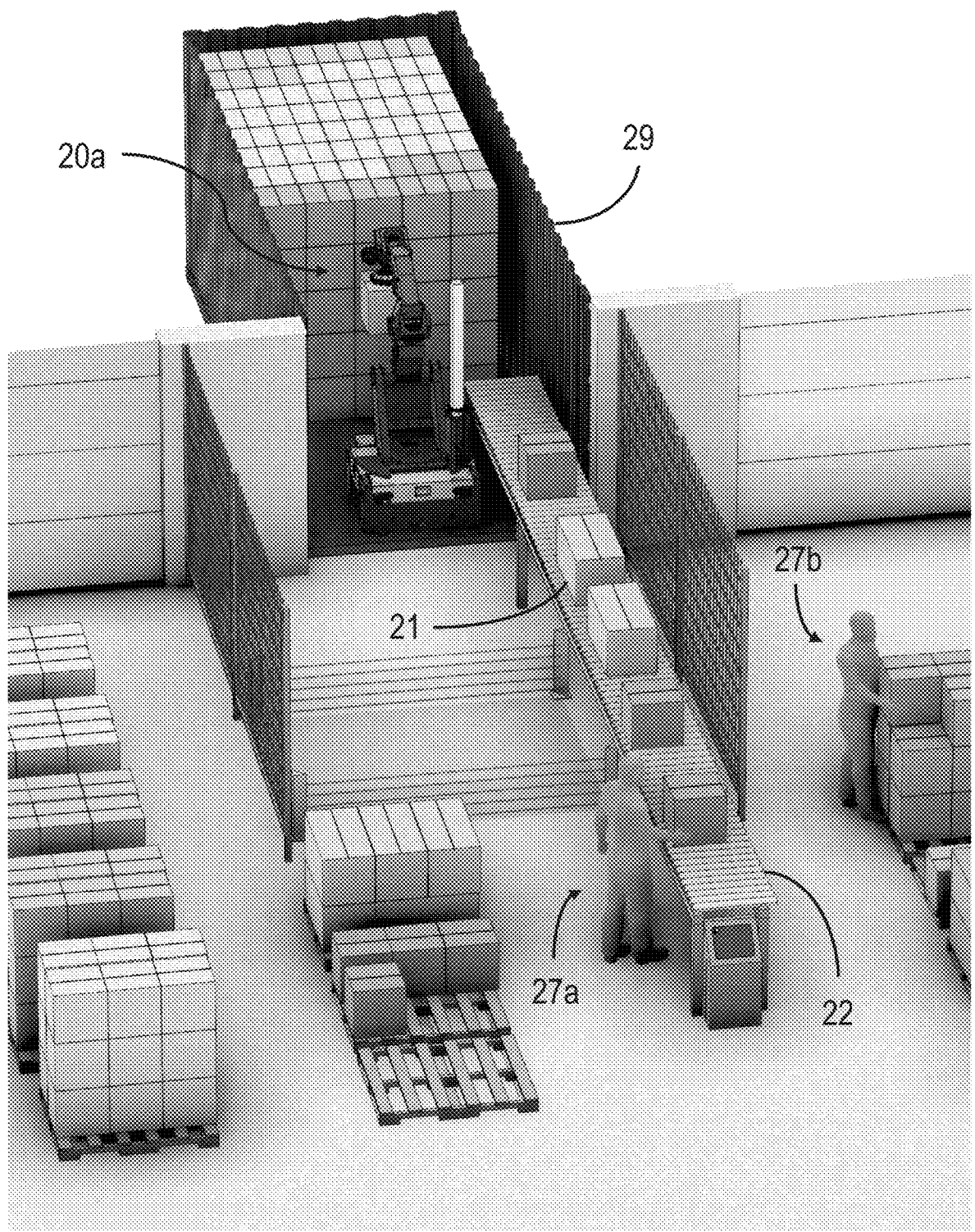
FIG. 2B depicts a robot unloading boxes from a truck and placing them on a conveyor belt, according to an illustrative embodiment of the invention.

FIG. 2B depicts a robot 20a unloading boxes 21 from a truck 29 and placing them on a conveyor belt 22. In this box picking application (as well as in other box picking applications), the robot 20a repetitiously picks a box, rotates, places the box, and rotates back to pick the next box. Although robot 20a of FIG. 2B is a different embodiment from robot 100 of FIGS. 1A and 1B, referring to the components of robot 100 identified in FIGS. 1A and 1B will ease explanation of the operation of the robot 20*a* in FIG. 2B.

During operation, the perception mast of robot 20*a* (analogous to the perception mast 140 of robot 100 of FIGS. 1A and 1B) may be configured to rotate independently of rotation of the turntable (analogous to the turntable 120) on which it is mounted to enable the perception modules (akin to perception modules 142) mounted on the perception mast to capture images of the environment that enable the robot 20*a* to plan its next movement while simultaneously executing a current movement. For example, while the robot 20*a* is picking a first box from the stack of boxes in the truck 29, the perception modules on the perception mast may point at and gather information about the location where the first box is to be placed (e.g., the conveyor belt 22). Then, after the turntable rotates and while the robot 20*a* is placing the first box on the conveyor belt, the perception mast may rotate (relative to the turntable) such that the perception modules on the perception mast point at the stack of boxes and gather information about the stack of boxes, which is used to determine the second box to be picked. As the turntable rotates back to allow the robot to pick the second box, the perception mast may gather updated information about the area surrounding the conveyor belt. In this way, the robot 20*a* may parallelize tasks which may otherwise have been performed sequentially, thus enabling faster and more efficient operation.

Also of note in FIG. 2B is that the robot 20*a* is working alongside humans (e.g., workers 27*a* and 27*b*). Given that the robot 20*a* is configured to perform many tasks that have traditionally been performed by humans, the robot 20*a* is designed to have a small footprint, both to enable access to areas designed to be accessed by humans, and to minimize the size of a safety field around the robot (e.g., into which humans are prevented from entering and/or which are associated with other safety controls, as explained in greater detail below).

Figure 2C:
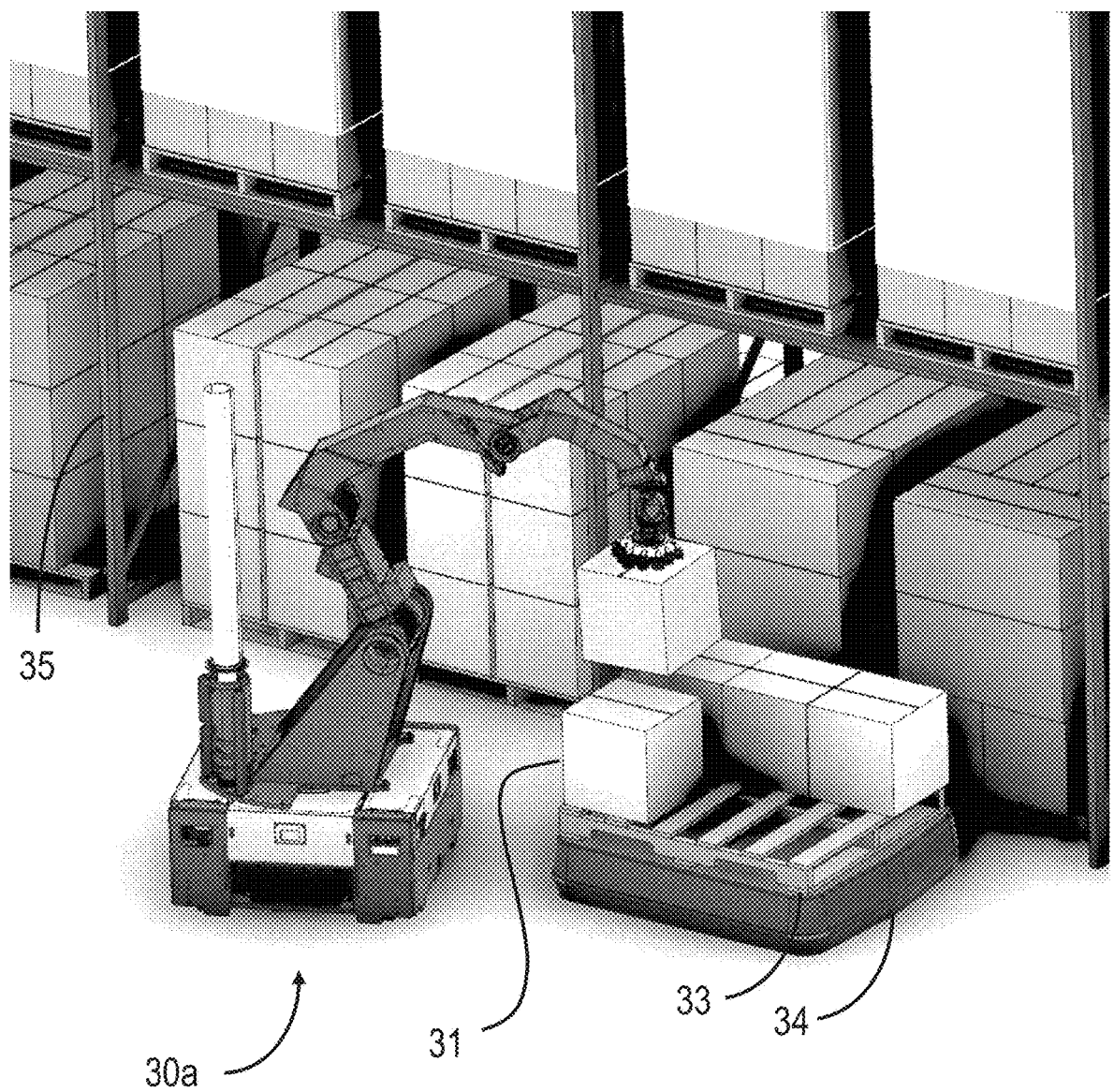
FIG. 2C depicts a robot performing an order building task in which the robot places boxes onto a pallet, according to an illustrative embodiment of the invention.

FIG. 2C depicts a robot 30*a* performing an order building task, in which the robot 30*a* places boxes 31 onto a pallet 33. In FIG. 2C, the pallet 33 is disposed on top of an autonomous mobile robot (AMR) 34, but it should be appreciated that the capabilities of the robot 30*a* described in this example apply to building pallets not associated with an AMR. In this task, the robot 30*a* picks boxes 31 disposed above, below, or within shelving 35 of the warehouse and places the boxes on the pallet 33. Certain box positions and orientations relative to the shelving may suggest different box picking strategies. For example, a box located on a low shelf may simply be picked by the robot by grasping a top surface of the box with the end effector of the robotic arm (thereby executing a "top pick"). However, if the box to be picked is on top of a stack of boxes, and there is limited clearance between the top of the box and the bottom of a horizontal divider of the shelving, the robot may opt to pick the box by grasping a side surface (thereby executing a "face pick").

To pick some boxes within a constrained environment, the robot may need to carefully adjust the orientation of its arm to avoid contacting other boxes or the surrounding shelving. For example, in a typical "keyhole problem", the robot may only be able to access a target box by navigating its arm through a small space or confined area (akin to a keyhole) defined by other boxes or the surrounding shelving. In such scenarios, coordination between the mobile base and the arm of the robot may be beneficial. For instance, being able to translate the base in any direction allows the robot to position itself as close as possible to the shelving, effectively extending the length of its arm (compared to conventional robots without omnidirectional drive which may be unable to navigate arbitrarily close to the shelving). Additionally, being able to translate the base backwards allows the robot to withdraw its arm from the shelving after picking the box without having to adjust joint angles (or minimizing the degree to which joint angles are adjusted), thereby enabling a simple solution to many keyhole problems.

The tasks depicted in FIGS. 2A-2C are only a few examples of applications in which an integrated mobile manipulator robot may be used, and the present disclosure is not limited to robots configured to perform only these specific tasks. For example, the robots described herein may be suited to perform tasks including, but not limited to: removing objects from a truck or container; placing objects on a conveyor belt; removing objects from a conveyor belt; organizing objects into a stack; organizing objects on a pallet; placing objects on a shelf; organizing objects on a shelf; removing objects from a shelf; picking objects from the top (e.g., performing a "top pick"); picking objects from a side (e.g., performing a "face pick"); coordinating with other mobile manipulator robots; coordinating with other warehouse robots (e.g., coordinating with AMRs); coordinating with humans; and many other tasks.

Example Robotic Arm

Figure 3:
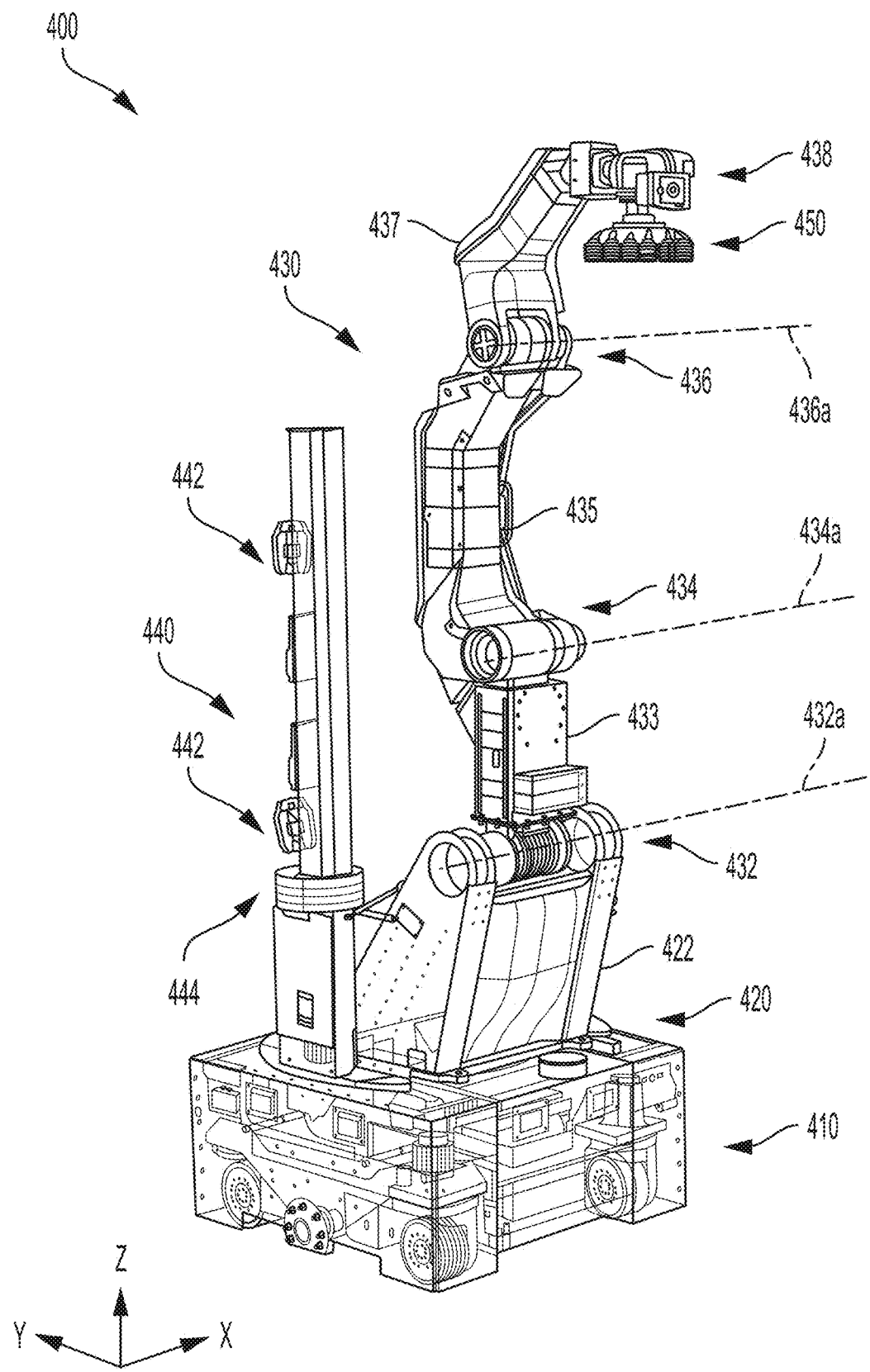
FIG. 3 is a perspective view of a robot, according to an illustrative embodiment of the invention.

FIG. 3 is a perspective view of a robot 400, according to an illustrative embodiment of the invention. The robot 400 includes a mobile base 410 and a turntable 420 rotatably coupled to the mobile base. A robotic arm 430 is operatively coupled to the turntable 420, as is a perception mast 440. The perception mast 440 includes an actuator 444 configured to enable rotation of the perception mast 440 relative to the turntable 420 and/or the mobile base 410, so that a direction of the perception modules 442 of the perception mast may be independently controlled.

The robotic arm 430 of FIG. 3 is a 6-DOF robotic arm. When considered in conjunction with the turntable 420 (which is configured to yaw relative to the mobile base about a vertical axis parallel to the Z axis), the arm/turntable system may be considered a 7-DOF system. The 6-DOF robotic arm 430 includes three pitch joints 432, 434, and 436, and a 3-DOF wrist 438 which, in some embodiments, may be a spherical 3-DOF wrist.

Starting at the turntable 420, the robotic arm 430 includes a turntable offset 422, which is fixed relative to the turntable 420. A distal portion of the turntable offset 422 is rotatably coupled to a proximal portion of a first link 433 at a first joint 432. A distal portion of the first link 433 is rotatably coupled to a proximal portion of a second link 435 at a second joint 434. A distal portion of the second link 435 is rotatably coupled to a proximal portion of a third link 437 at a third joint 436. The first, second, and third joints 432, 434, and 436 are associated with first, second, and third axes 432*a*, 434*a*, and 436*a*, respectively.

The first, second, and third joints 432, 434, and 436 are additionally associated with first, second, and third actuators (not labeled) which are configured to rotate a link about an axis. Generally, the nth actuator is configured to rotate the nth link about the nth axis associated with the nth joint. Specifically, the first actuator is configured to rotate the first link 433 about the first axis 432*a* associated with the first joint 432, the second actuator is configured to rotate the second link 435 about the second axis 434*a* associated with the second joint 434, and the third actuator is configured to rotate the third link 437 about the third axis 436*a* associated with the third joint 436. In the embodiment shown in FIG.

3, the first, second, and third axes 432a, 434a, and 436a are parallel (and, in this case, are all parallel to the X axis). In the embodiment shown in FIG. 3, the first, second, and third joints 432, 434, and 436 are all pitch joints.

In some embodiments, a robotic arm of a highly integrated mobile manipulator robot may include a different number of degrees of freedom than the robotic arms discussed above. Additionally, a robotic arm need not be limited to a robotic arm with three pitch joints and a 3-DOF wrist. A robotic arm of a highly integrated mobile manipulator robot may include any suitable number of joints of any suitable type, whether revolute or prismatic. Revolute joints need not be oriented as pitch joints, but rather may be pitch, roll, yaw, or any other suitable type of joint.

Returning to FIG. 3, the robotic arm 430 includes a wrist 438. As noted above, the wrist 438 is a 3-DOF wrist, and in some embodiments may be a spherical 3-DOF wrist. The wrist 438 is coupled to a distal portion of the third link 437. The wrist 438 includes three actuators configured to rotate an end effector 450 coupled to a distal portion of the wrist 438 about three mutually perpendicular axes. Specifically, the wrist may include a first wrist actuator configured to rotate the end effector relative to a distal link of the arm (e.g., the third link 437) about a first wrist axis, a second wrist actuator configured to rotate the end effector relative to the distal link about a second wrist axis, and a third wrist actuator configured to rotate the end effector relative to the distal link about a third wrist axis. The first, second, and third wrist axes may be mutually perpendicular. In embodiments in which the wrist is a spherical wrist, the first, second, and third wrist axes may intersect.

In some embodiments, an end effector may be associated with one or more sensors. For example, a force/torque sensor may measure forces and/or torques (e.g., wrenches) applied to the end effector. Alternatively or additionally, a sensor may measure wrenches applied to a wrist of the robotic arm by the end effector (and, for example, an object grasped by the end effector) as the object is manipulated. Signals from these (or other) sensors may be used during mass estimation and/or path planning operations. In some embodiments, sensors associated with an end effector may include an integrated force/torque sensor, such as a 6-axis force/torque sensor. In some embodiments, separate sensors (e.g., separate force and torque sensors) may be employed. Some embodiments may include only force sensors (e.g., uniaxial force sensors, or multi-axis force sensors), and some embodiments may include only torque sensors. In some embodiments, an end effector may be associated with a custom sensing arrangement. For example, one or more sensors (e.g., one or more uniaxial sensors) may be arranged to enable sensing of forces and/or torques along multiple axes. An end effector (or another portion of the robotic arm) may additionally include any appropriate number or configuration of cameras, distance sensors, pressure sensors, light sensors, or any other suitable sensors, whether related to sensing characteristics of the payload or otherwise, as the disclosure is not limited in this regard.

As discussed above, robotic devices tasked with moving objects from a first location to second location in a pick-and-place operation may be able to improve their performance by grasping and placing multiple objects in a single pick-place cycle provided that the pick-place operation can be accomplished without damaging the objects in transit. Some embodiments of the present disclosure relate to techniques for multi-pick planning and execution and multi-place operations.

Figure 4:
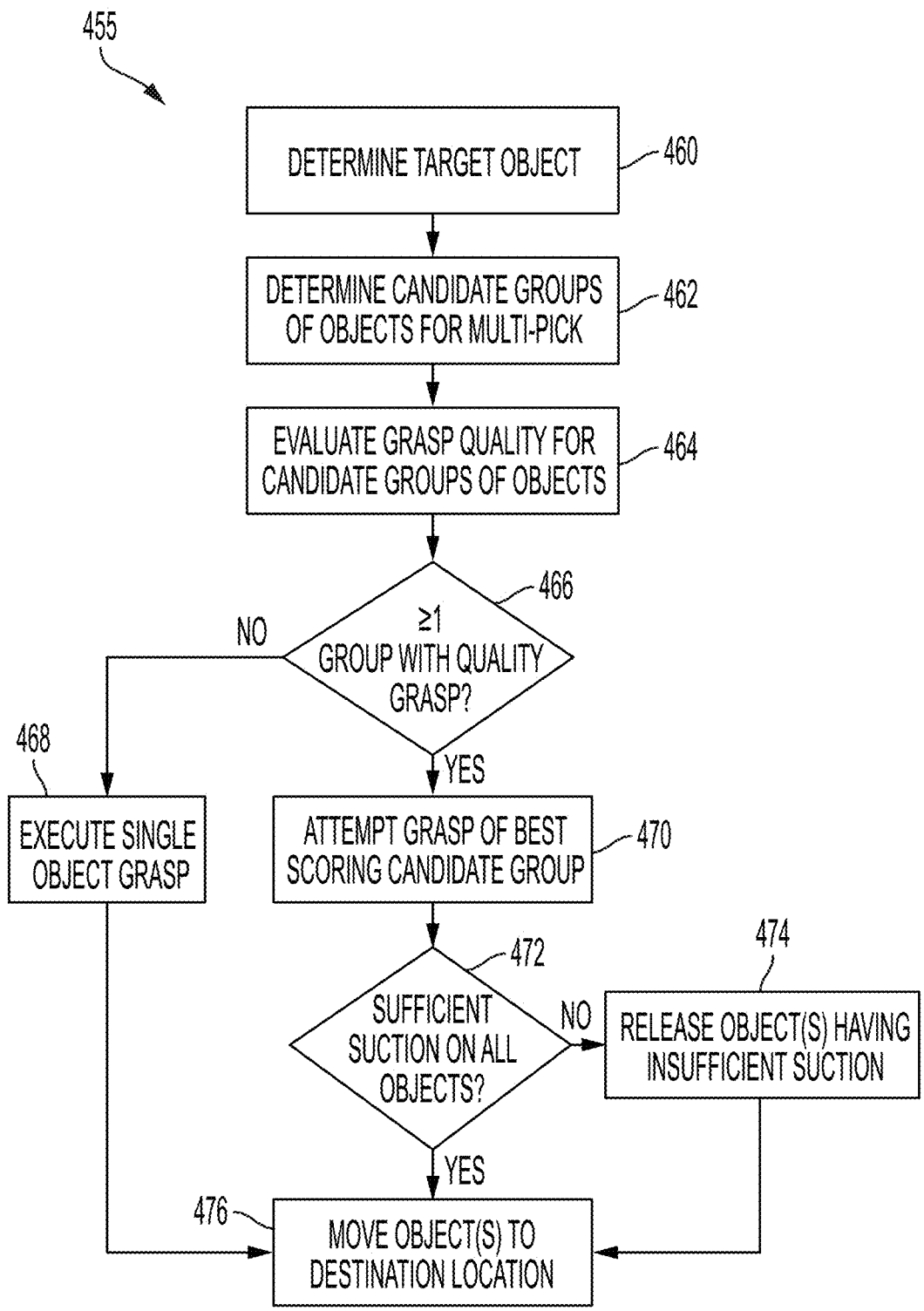
FIG. 4 is a flowchart of a process for grasping multiple objects with a gripper of a robot, according to an illustrative embodiment of the invention.

To enable multi-pick operations, a robotic device may determine which groups of objects are capable of being grasped together, plan a strategy for grasping the group of objects (e.g., including determination of a gripper pose), then then grasp the group of objects based on the planned strategy. Alternatively, in some embodiments, each of a plurality of objects at the first location may evaluated for possible multi-picking according to multi-pick criteria (e.g., whether the object is small enough). After determining which objects satisfy the multi-pick criteria, a target object for grasping may be selected and objects in the vicinity that also satisfy the multi-pick criteria may be assessed for possible multi-picking with the target object. FIG. 4 illustrates a process 455 for performing a multi-pick operation, in accordance with some embodiments of the present disclosure. In act 460, a target object (e.g., a parcel such as a box) to grasp with an end effector of a robotic device is determined. In some embodiments, candidate objects of interest to be grasped by the robotic device may be detected in one or more images (e.g., RGBD images) captured by a perception module of the robotic device. For instance, the one or more images may be analyzed using one or more trained object detection models to detect one or more object faces in the image(s), and a particular target object of the set of detected objects may be selected (e.g., to be grasped next by the robotic device). In some embodiments, a set of objects capable of being grasped by the robotic device (which may include all or a subset of objects in the environment near the robot) may be determined as candidates for grasping. Then, one of the candidates may be selected as the target object, wherein the selection is based on various heuristics, rules, or other factors that may be dependent on the particular environment and/or the capabilities of the particular robotic device.

Process 455 then proceeds to act 462, where one or more candidate groups of objects to multi-pick is determined. For instance, each of the "non-target" objects detected by the perception system of the robotic device in the vicinity of the target object may be evaluated to determine whether the object meets one or more criteria to qualify for inclusion in a group of objects that could be multi-picked along with the target object. Conversely, each of the non-target objects may be evaluated to determine if they do not meet certain criteria that qualify them for multi-picking, and should be excluded from consideration for inclusion in a candidate group of objects for multi-pick.

Figure 5A:
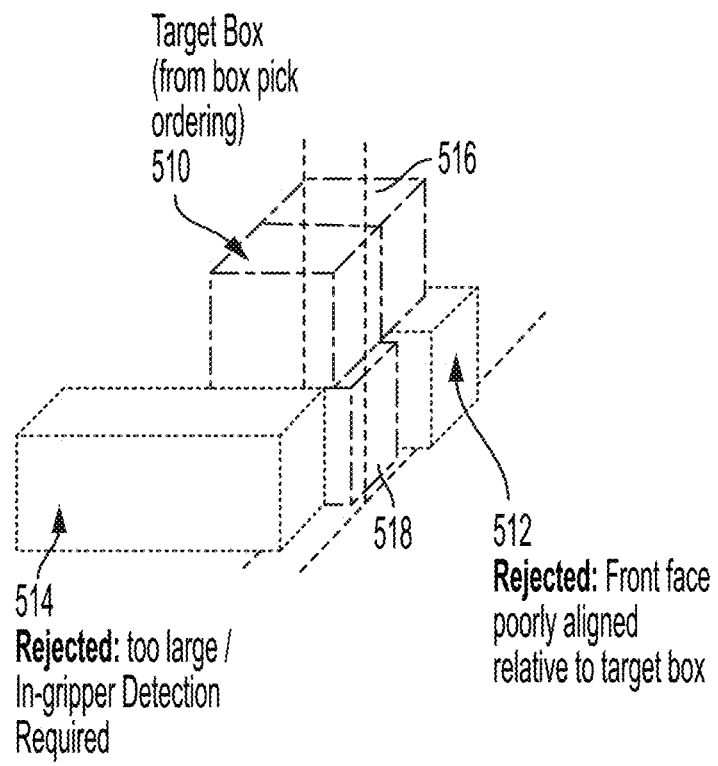
FIG. 5A schematically illustrates a process for determining which objects in the vicinity of a target object are valid candidates for including in a candidate group of objects to be grasped in a multi-pick operation, according to an illustrative embodiment of the invention.

FIG. 5A schematically illustrates an example scenario of a stack of boxes capable of being grasped by a robotic device. In the example of FIG. 5A, a target box 510 has been selected (e.g., from a box pick ordering process). Each of the other boxes in the stack may be evaluated to determine whether it is a valid candidate to pick along with box 510 in a multi-pick operation. Various criteria may be used to determine whether an object is a valid candidate to pick in a multi-pick operation. For instance, if the face of the object is not aligned well with the face of the target object, it may be excluded as a valid multi-pick candidate. Box 512 in FIG. 5A illustrates an example of a misaligned non-target object that may be excluded from multi-pick consideration. As shown, the front face of box 512 is located substantially forward from the face of target box 510. In some embodiments, if the non-target object is misaligned by more than a threshold amount (e.g., 2 cm, 3 cm, 5 cm, etc.) relative to the target object, the non-target object may be excluded from consideration as a multi-pick candidate.

FIGS. 5D and 5E schematically illustrate top down views of two objects that are misaligned but may be considered as candidate objects to be grasped together. FIG. 5D shows a first process for determining whether the neighboring objects are sufficiently aligned to be grasped together in accordance with some embodiments of the present disclosure. Although the alignment of only two neighboring objects relative to each other is shown in FIG. 5D, it should be appreciated that alignment of more than two neighboring objects may also be determined using the techniques described herein. As shown in FIG. 5D, an alignment window 570 may be defined relative to the orientation of the front face of target object 572. In the example of FIG. 5D, alignment window 570 is formed as a set of parallel planes aligned to the orientation of target object 572, wherein the parallel planes are separated by a predetermined distance. If all four corners of the front faces of the target object 572 and the neighboring object 574 fall within the alignment window 570, it may be determined that the target object 572 and the neighboring object 574 are sufficiently aligned to be grasped together. However, if, as shown in FIG. 5D at least one of the corners falls outside of the alignment window 570, it may be determined that target object 572 and neighboring object 574 are not sufficiently aligned to be grasped together as part of a candidate group of objects in a multi-pick operation.

FIG. 5E shows a second process for determining whether the neighboring objects are sufficiently aligned to be grasped together, which is less reliant on the orientation of one of the objects (e.g., target object 572) under consideration, in accordance with some embodiments of the present disclosure. Although the alignment of only two neighboring objects relative to each other is shown in FIG. 5E, it should be appreciated that alignment of more than two neighboring objects may also be determined using the techniques described herein. For instance, if there are multiple neighboring objects in the vicinity of a target object, two or more of the orientations of the individual objects may be taken into account when considering alignment of the objects. As shown in FIG. 5E, an alignment window 580 may be defined relative to the orientation of the front face of both the target object 582 and the neighboring object 584, which enables the orientation of the neighboring object 584 to have more influence in the alignment determination compared to the alignment process shown in FIG. 5D. If, as shown in the example of FIG. 5E, all corners of the front faces of the target object 582 and the neighboring object 584 are within the alignment window 580, it may be determined that the target object 582 and the neighboring object 584 are sufficiently aligned to be grasped together. However, if at least one of the corners of the front face of target object 582 and the neighboring object 584 are outside of the alignment window 580, it may be determined that target object 582 and neighboring object 584 are not sufficiently aligned to be grasped together as part of a candidate group of objects in a multi-pick operation.

Non-limiting examples of other criteria that may be used to exclude non-target objects from multi-pick consideration may include whether the object is too large, whether the object has an unknown dimension, and/or whether the object has a longest dimension that is different from the longest dimension of the target object. Box 514 in FIG. 5A illustrates an example of a non-target object that is too large or alternatively has an unknown dimension, and is thus excluded as a valid multi-pick candidate to pick along with target box 510. In some embodiments, a robotic device may store information about a plurality of object prototypes (e.g., boxes that the robotic device recently detected with its perception system). To the extent possible, each of the objects detected by the perception system of the robotic system may be associated with one of the prototypes. Objects that are not capable of being matched to a prototype with a threshold level of certainty (e.g., due to having an unknown dimension such as depth) may be determined to require "in-gripper" detection. During in-gripper detection, the robotic device may be controlled to grasp the object and rotate it to determine one or more unknown dimensions (e.g., the depth dimension). A new prototype may then be created based on the object with fully specified dimensions. In the example of FIG. 5A, box 514, when viewed from the front of the stack may have an unknown depth dimension such that it cannot be matched to any stored prototype. Due to this uncertainty about box 514, it may be excluded as a valid multi-pick candidate. After excluding boxes 512 and 514 as valid multi-pick candidates based on the criteria above, the remaining boxes 516 and 518 may be included in the set of valid multi-pick candidates. For instance, although the front face of box 518 is slightly misaligned with the front face of target box 510, the misalignment may be less than a threshold amount such that it remains a valid multi-pick candidate.

After the set of valid multi-pick candidates (e.g., objects that can be picked along with the target object) have been determined, a plurality of candidate groups of objects may be determined using objects from the set of valid multi-pick candidates. For instance, it may be the case that more objects are included in the set of valid multi-pick candidates than can be reached simultaneously by the gripper of the robotic device. Accordingly, multiple candidate groups of objects (each of which includes the target object) may be formed and evaluated. In some embodiments, at least some of the objects in a candidate group may be excluded from the group based on dependencies with other objects that have been excluded from multi-pick consideration (e.g., boxes 512 and 514 in the example of FIG. 5A). For instance, when considering a particular gripper pose, it may be determined whether any of the objects in a candidate group is buried by objects not included in the group. An object may be considered buried if it has an object that has been excluded from multi-pick consideration resting on top of it in the stack. Including objects in a candidate group that are buried by objects that will not be picked with the group may result in other boxes (that are not grasped, but on top) falling on the floor, thereby slowing down the robot and potentially damaging the contents of the dropped object(s).

Figure 5B:
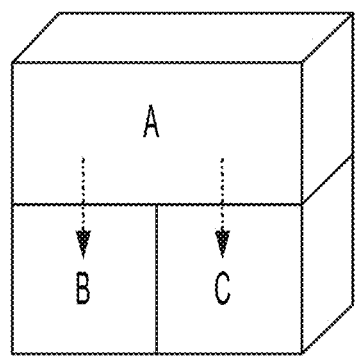
FIG. 5B schematically illustrates dependencies between different objects in a stack of objects, according to an illustrative embodiment of the invention.

FIG. 5B schematically illustrates the concept of a buried object based on dependencies between the objects in a stack. In the example of FIG. 5B, boxes B and C are dependent on box A, since box A rests on boxes B and C. Therefore any candidate group that includes box B or box C should also include box A to avoid picking a buried box.

Figure 5C:
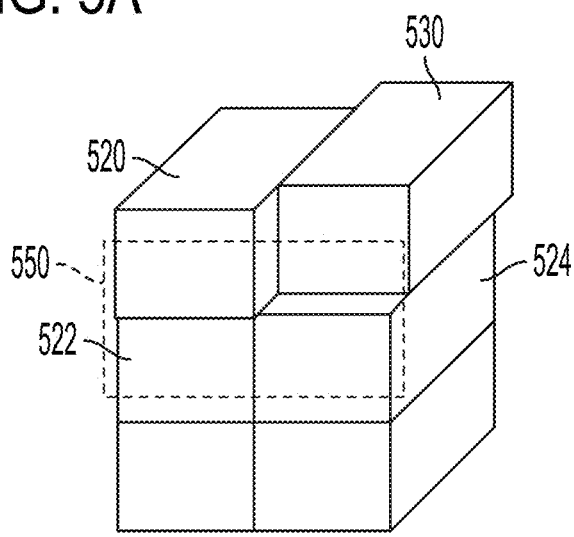
FIG. 5C schematically illustrates how objects in a candidate group of objects may be excluded from the group based on a dependency with other objects in a stack of objects, according to an illustrative embodiment of the invention.

FIG. 5C schematically illustrates the concept of a buried box for a particular gripper pose shown using dashed box 550. In the example of FIG. 5C, box 530 has been excluded from multi-picking due to a misalignment with the other boxes in the stack. Although the gripper can reach boxes 520, 522 and 524 for the gripper pose under consideration in FIG. 5C, picking box 524 in this group is likely to result in excluded box 530 located above box 524 falling to the floor because of its dependency on box 524. Accordingly, for the gripper pose shown in FIG. 5C, box 524 may be excluded from the group such that only boxes 520 and 522 remain included.

In some embodiments of the present disclosure, after the largest valid group of objects for a particular gripper pose is determined (e.g., boxes 520 and 522 in the example of FIG. 5C), one or more valid sub-groups of objects (e.g., sub-groups not having buried objects) may be examined to determine whether a better grasp quality can be achieved. For example, in some instances it may be preferred not to grasp every reachable object in a candidate group. As an example, if only a small number of suction cups on the gripper are expected to contact an object for a particular gripper pose, it may be preferred not to attempt to grasp that object as part of the candidate group of objects. Rather, it may be preferred to leave that object to be picked later, perhaps as part of another group.

Returning to process 455 in FIG. 4, after one or more candidate groups of objects for multi-pick are determined in act 462, process 455 proceeds to act 464, where the grasp quality for each of the candidate groups is evaluated. For instance, a plurality of candidate gripper poses may be assessed for each candidate group of objects. Some of the candidate gripper poses may be excluded due to collisions with the environment (e.g., collisions with the sides or walls of a truck), whereas other candidate gripper poses may provide a better quality grasp of the group of objects. In some embodiments, acts 462 and 464 may be performed in a single act. For instance, the grasp quality of each candidate group of objects may be evaluated before determining a next candidate group. Such an implementation may use fewer computational resources than first determining all of the candidate group(s) and then evaluating grasp quality for the groups, as only the candidate group with the best grasp quality (or a few candidate groups with the top grasp quality scores) encountered thus far may be kept in memory for comparison with the next candidate group upon identification.

Figure 6A:
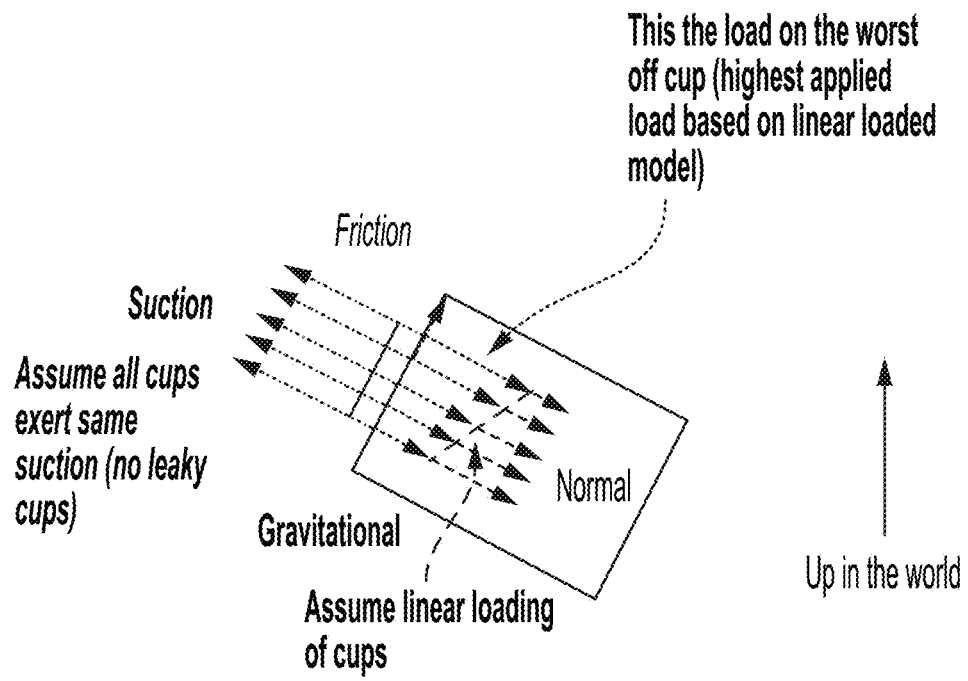
FIG. 6A schematically illustrates a physical model for estimating forces operating on a grasped object, according to an illustrative embodiment of the invention.

In some embodiments, determining grasp quality for a candidate group of objects comprises determining a grasp quality for each object in the candidate group using a physical model of the gripper-object interaction. FIG. 6A schematically illustrates a force diagram of a face pick of an object, showing the anticipated forces between the gripper and the object. Face picks in particular are challenging to maintain a good grasp quality because of cascade failure, where suction cups located near the top of the gripper are overloaded with force which tends to separate the gripper from the object. It should be appreciated that cascade failure may also occur with top picks (e.g., when the grasp on the top face is not directly above the center of mass of the object). Some embodiments are directed to techniques for modelling these forces for each object in a candidate group and determining gripper positioning to reduce grasp failures.

In some embodiments, the physical model used to estimate object-gripper interactions may determine the anticipated force required by the "worst off" cup in the grasp across all objects in the group, and that anticipated force for the worst off cup may be used as a grasp quality score for the group. For instance, higher scores may reflect poorer quality grasps, since the demands on the robot hardware may be greater. As shown in FIG. 6A, the physical model may take into consideration various static forces between the gripper and the object including a suction force applied by the gripper to the object, a friction force at the gripper-object interface, and a gravitational force exerted on the object when grasped by the gripper. Assuming all suction cups of the gripper exert the same amount of suction, and assuming linear loading of the suction cups, the load on the worst off cup can be determined, and this force may be used, at least in part, to determine a grasp quality score for the object when grasped by the gripper with a particular pose.

Figure 6B:
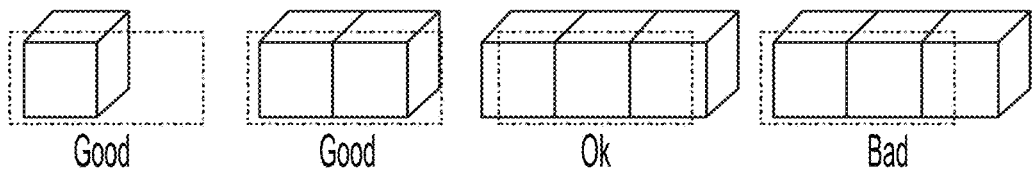
FIG. 6B schematically illustrates determination of grasp quality scores for different gripper poses relative to a group of objects capable of being grasped simultaneously, according to an illustrative embodiment of the invention.

In some embodiments, one or more heuristics may be used to promote the selection of candidate groups having a larger number of objects. Selection of such groups may be advantageous from a robot throughput perspective but may put greater demands on the worst off cup in the grasp. FIG. 6B schematically illustrates an evaluation of grasp quality for different gripper poses relative to objects to be grasped. For a given gripper pose relative to a target object, the objects that could be reached by the gripper and subsets of those objects may be analyzed to determine a grasp quality score. In FIG. 6B, the far left scenario with a single box being picked is associated with a good grasp quality score due to the entire face of the box having contact with suction cups of the gripper. Because groups with a larger number of objects may be preferred, grasp quality analyses for groups of two and three boxes may also be evaluated. As shown in FIG. 6B, in the two-box scenario, the entire face of both boxes is in contact with suction cups of the gripper, resulting in a good grasp quality score for the two-box group. Considering only the scenarios on the left of FIG. 6B with both having a good grasp quality score, the larger two-box group may be selected as preferred given that multiple boxes can be securely moved in such a multi-pick operation.

Under the assumption that a further larger group may be preferred, grasp quality scores for each of the two three-box scenarios with different gripper poses shown on the right side of FIG. 6B may also be evaluated. The far right three-box scenario may be determined to have a bad grasp quality score due to the far right box in the group having very little coverage of the suction cups of the gripper on its face. In such an instance, the worst off cup may be located on the face of the far right box of the group, with a higher likelihood that if a grasp was attempted in this scenario, the box on the far right in the group may not be grasped with sufficient strength to prevent the box from being dropped. Of the two three-box scenarios shown in FIG. 6B, the "centered" gripper pose shown on the middle right, only a single box (the center box) with full coverage of gripper cups contacting its surface, with the other two boxes having only partial coverage of gripper contact. Such a scenario may be associated with a grasp quality score between the "good" grasp quality scores of the two left scenarios and the "bad" grasp quality score of the far right three-box scenario. From among the four gripper pose possibilities shown in FIG. 6B, the two-box gripper pose may be selected based on its associated "good" grasp quality score, and having the largest group of boxes.

Figure 6C:
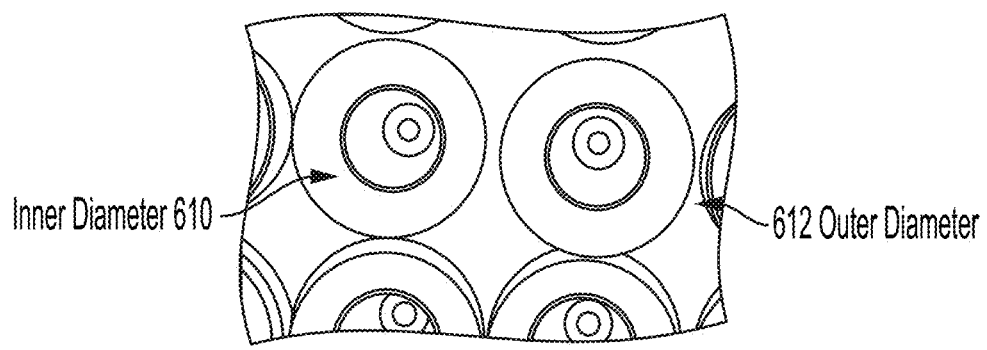
FIG. 6C illustrates suction cups of a gripper having an inner diameter and an outer diameter, according to an illustrative embodiment of the invention.

Different types of errors (e.g., error in perception of objects, error in actuation of robot arm, error in robot calibration, etc.) may make it difficult to predict with certainty which suction cups of the gripper will come into contact with and successfully seal on the object the robot attempts to grasp. In some embodiments, one or more of the suction cups may be classified based on a confidence that the cup will form a good seal with the object. For instance, each of the suction cups may be classified as confident or unconfident. Such a classification may enable the robot to treat unconfident cups more cautiously than confident cups when performing grasp planning and/or gripper control. In an example shown in FIG. 6C, each suction cup of the gripper may include an inner diameter 610 within which suction is applied and an outer diameter 612 forming the outer boundary of the cup. The material between the inner diameter 610 and the outer diameter 612 may be compressible to enable the cup to be pressed against an object when attempting to grasp the object. To ensure a good seal with an object, it may be important for the entirety of the inner diameter 610 be in contact with the object, though it may be less important that the entire outer diameter 612 of the cup be in contact with the object. In some embodiments, one or more suction cups of the robotic gripper are classified as confident if the output diameter 612 is within the object face being grasped by more than a first tolerance amount and are classified as unconfident if the inner diameter 610 but not the outer diameter 612 is within the object face being grasped by more than a second tolerance amount. In some embodiments, the first tolerance amount and the second tolerance amount are the same.

Figure 6D:
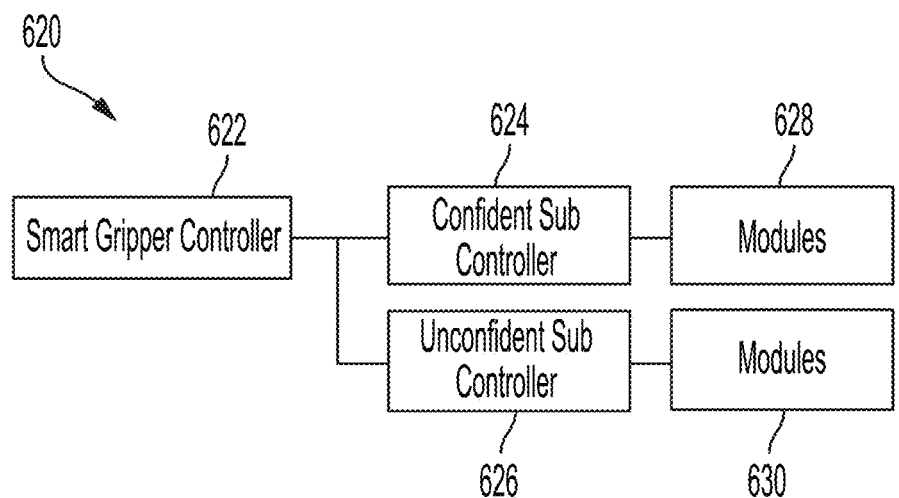
FIG. 6D illustrates an architecture for a gripper controller including sub-controllers for suction cups having different confidence levels, according to an illustrative embodiment of the invention.

In some embodiments, classifications (e.g., confident, unconfident) associated with suction cups of a gripper may be used to inform a control strategy to improve the overall robustness of the grasp obtained by the gripper on one or more objects. FIG. 6D illustrates an example architecture 620 of a gripper controller in accordance with some embodiments of the present disclosure. As shown, gripper controller 622 may be associated with a set of sub-controllers running in parallel with corresponding modules for performing various control operations (e.g., leak detection, cup retrying, etc.) associated with the suction cups of the gripper. Each of the sub-controllers and its corresponding modules may be associated with cups having a different confidence level. For instance, architecture 620 includes a confident sub-controller 624 and associated first modules 628 and an unconfident sub-controller 626 and associated second modules 630. The modules (e.g., first modules 628, second modules 630) may be different and/or tuned based on the confidence of the associated cups. For example, unconfident sub-controller 626 may be configured to instruct modules 630 to perform leak detection, but to use fewer cup retrying attempts compared to cups classified as confident. In this way, unconfident cups may be associated with more strict control strategies, which may result an overall better vacuum on the grasped object through the remaining cups (e.g., cups associated with a higher confidence).

Figure 7A:
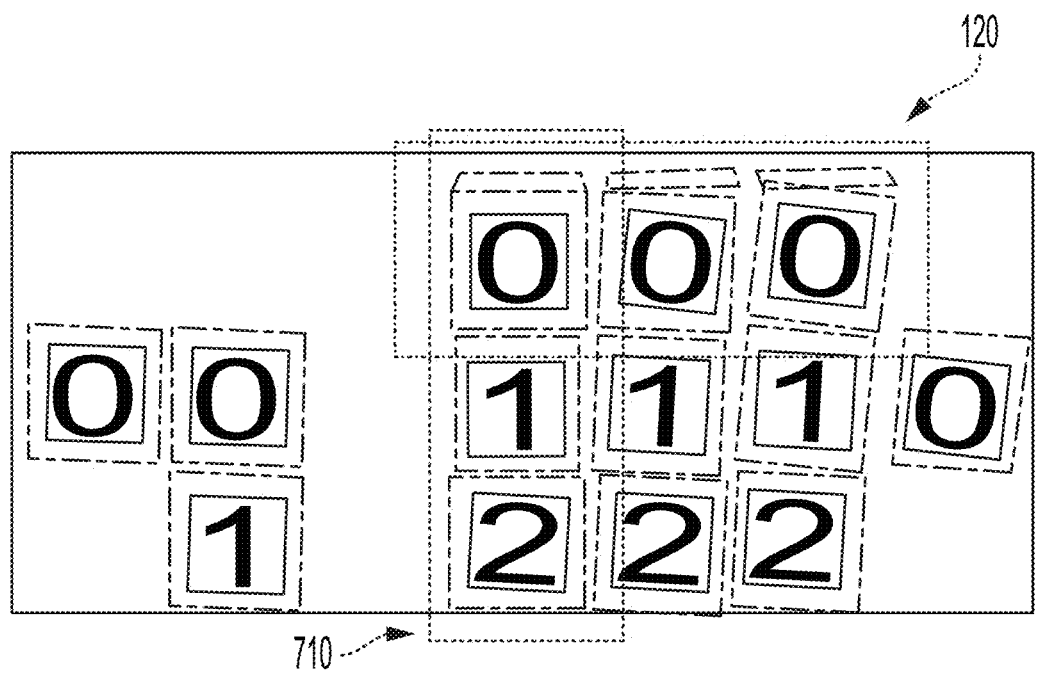
FIG. 7A schematically illustrates a process for selecting a candidate group of objects to grasp in a multi-pick operation based on a depth of the objects in the group, according to an illustrative embodiment of the invention.

The inventors have recognized and appreciated that factors other than factors such as grasp quality that capture the robot's ability to successfully hold and move objects may be taken into consideration when performing grasp planning for a multi-pick operation. For example, the stability of a facade of a stack of objects may be influenced by the order in which the robot picks objects from the stack. In general it may be preferred to continuously pick objects from the top of the facade to avoid creating unstable columns of objects in the stack. To this end, some embodiments model the dependence between objects in a stack when considering which objects to grasp in a multi-pick operation. In one embodiment, the dependence between objects in a stack may be modeled using an acyclic graph, with each node in the graph corresponding to an object and each directed edge from node A to node B in the graph representing the physical blocking of object B by object A. The "depth" of each object in the stack (or a subset of all objects not excluded from multi-picking) may be determined as the longest path between a free object (i.e., an object having a depth of 0) and the node representing the object. Recursively, the depth for a given object in the stack may be one more than the maximum depth among the boxes that directly block it. FIG. 7A schematically illustrates depths calculated for different boxes in a facade of a stack of boxes in accordance with some embodiments of the present disclosure. As shown, the boxes in the top row of the facade are "free" boxes and are assigned a depth of 0. Boxes located below the free boxes in the facade are assigned a depth of 1, and boxes in the bottom row of the facade are assigned a depth of 2. When performing grasp planning for a multi-pick operation, candidate groups of objects that have an overall lower total depth may be preferred over candidate groups of objects that have a higher total depth. FIG. 7A illustrates a first candidate group of objects 710, which includes three objects vertically oriented in the facade and a second candidate group of objects 720 horizontally oriented in the facade. The total depth of the objects in the first candidate group of objects 710 is 0+1+2=3, whereas the total depth of the objects in the second candidate group of objects 720 is 0+0+0=0. In this example, selection of the second candidate group of objects 720 may be preferred for grasping based on its lower depth of 0 compared with the higher depth of 3 for the first candidate group of objects 710.

As another example of a factor that may be considered when considering which candidate group of objects to grasp, some embodiments consider how the objects in a group will be placed (e.g., on a conveyor, on a pallet, etc.). For instance, some objects in a first candidate group may be placed in a faster or more reliable manner than objects in a second candidate group. Various aspects of object placement may be considered when determining which candidate group of objects to grasp in a multi-pick operation. In an example of placing objects on a conveyor, a candidate group of objects may be selected based, at least in part, on the extent to which grasping the group of objects requires objects to be dropped high above the conveyor to be placed in a desired orientation (e.g., longest dimension of the object oriented along the moving direction of the conveyor). To this end, some embodiments of the present disclosure may determine a placement orientation for objects in each of a plurality of candidate groups of objects and determine whether the drop height for any object in the group exceeds a threshold drop distance. Candidate groups of objects with few or no objects that exceed the threshold drop distance may be preferred for grasping compared to candidate groups of objects with at least one or several objects having a drop distance that exceeds the threshold. It should be appreciated that drop distance is merely one example of an object placement property that may be taken into consideration when determining which candidate group of objects to select for grasping and additional or alternate object placement properties may be used.

In a single-pick operation, any gripper pose (e.g., horizontal, angled, vertical) that brings a reasonable number of cups into contact with the face of the object to be picked may be considered when evaluating gripper poses. In a multi-pick operation (at least for rectangular-faced objects), it is generally preferable to pick multiple objects that are aligned horizontally or vertically, as angled orientations of the gripper are likely to result in minimal contact with some boxes even though they may be within reach of the gripper in such a gripper pose.

Returning to process 455 shown in FIG. 4, after evaluating a grasp quality for candidate groups of objects (e.g., all reachable valid objects and subsets of those objects), process 455 proceeds to act 466, where it is determined whether there is at least one candidate group (with at least two objects) associated with a quality grasp score (e.g., a grasp quality score above a particular threshold value). As should be appreciated from the foregoing, other factors in addition to grasp quality including, but not limited to, total depth of objects in a candidate group and/or object placement properties may be taken into consideration when determining a candidate group of objects to select for grasping. If it is determined in act 466 that there are no candidate groups with at least two objects associated with a quality grasp score, process 455 proceeds to act 468, where a single-pick operation (e.g., of the target object) is executed. After the single-pick operation is executed, process 455 proceeds to act 476, where the single object is moved to a destination location. If it is determined in act 466 that there is at least one candidate group having multiple objects associated with a grasp quality score greater than a threshold value (i.e., a valid multi-pick operation is possible), process 455 proceeds to act 470, where a grasp of the best scoring candidate group is attempted. Process 455 then proceeds to act 472, where it is determined whether there is sufficient suction on all objects in the group.

The inventors have recognized and appreciated that the expected quality of a planned grasp on a group of objects may be different than the quality of the actual grasp once attempted. For instance, one or more of the suction cups on the gripper may fail to have a good seal with the grasped face of one or more of the objects in the group (e.g., due to integrity issues with the face of the object, the presence of a defective cup assembly in the gripper, etc.). In act 472, the grasp quality of each of the grasped objects in the group is evaluated to determine whether the gripper has sufficient suction on the grasped object to be able to safely move the object without dropping it. In some embodiments, each cup assembly of the suction-based gripper may include a pressure sensor that enables measurement of the pressure within the cup assembly. Such individual cup pressure measurements may enable the robotic device to determine a number of suction cups of the gripper that are sufficiently engaged with the face of each object in the group. For objects that have an insufficient number of cups with sufficient suction, it may be determined that suction has failed on that object, and process 455 may proceed to act 474, where the object(s) with insufficient suction may be released from the gripper prior to moving the remaining objects to a destination location in act 476.

In a single-pick operation, if it is determined that suction has failed on the target object after attempting to grasp it, the robotic device may be configured to release the target object and pick a different object from the stack (e.g., a next-best target candidate). For multi-pick operations in which multiple objects are grasped, if all grasped objects have poor suction, they may all be released, similar to the single-pick scenario. However, if some grasped objects have good suction and others do not, the determination of how to handle objects with poor suction may not be as straightforward. In the situation where the objects in the grasped group are arranged horizontally in a stack of objects, the robotic device may be configured, in some embodiments, to release only the object that has insufficient suction, and continue with moving the remaining objects to the destination location. In the situation where the objects in the grasped group are arranged vertically in a stack of objects, the robotic device may be configured, in some embodiments, to selectively release objects in the grasped group based on the relative positioning of the object with insufficient suction and the other objects in the group.

Figure 7B:
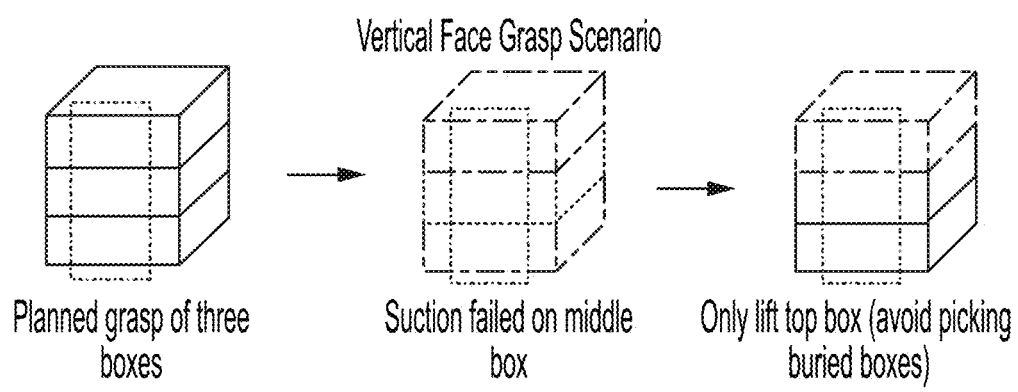
FIG. 7B schematically illustrates a process for excluding buried objects from being grasped in a multi-pick operation, according to an illustrative embodiment of the invention.

FIG. 7B schematically illustrates a multi-pick scenario in which the planned multi-pick grasp includes a group of three boxes arranged vertically. In this scenario, the bottom box in the stack may be considered a "buried" box since successful extraction of that box from the stack of boxes may be dependent on successful extraction of the box located on top of it (the middle box in the example of FIG. 7B). After attempting the grasp of the vertical stack of boxes (e.g., by applying suction to the boxes), when it is determined that the middle box has insufficient suction, both the middle box and the box below it may be released, and only the top box may be lifted and transported to the destination location to avoid picking the lower box since it is buried. By contrast, if only the lower box was determined to have insufficient suction, the robotic device may be configured to release only the lower box, and continue with lifting and transporting the top two boxes to the destination location.

In a single-pick operation, when the grasped object is dropped during transit to the destination location, the robotic device may be configured to initiate a dropped object sequence to retrieve the dropped object prior to continuing with the next pick-place cycle. In some embodiments, when one or more objects are dropped during transport in a multi-pick scenario, the robotic device may be configured to finish placing any remaining objects that remain grasped following the drop, then may proceed to retrieve the dropped object prior to continuing with the next pick-place cycle.

Collision avoidance is important to ensure that grasped objects are transported to the destination location without being dropped due to a collision with features of the environment (e.g., walls or ceiling of a truck). In a single-pick scenario, collision avoidance may be taken into consideration when planning an arm trajectory by modelling the grasped target object as a volume that moves through the planned trajectory. Trajectories in which the modeled volume contacts one or more obstacles (e.g., truck wall, truck ceiling, the robotic device) may be determined to be invalid trajectories that are not selected for execution. In a multi-pick scenario, some embodiments may model the simultaneously grasped objects as a single volume that encloses all of the objects in the group regardless of their actual shapes. Although in some instances, such a modelling approach may be overly conservative if the grasped objects have different dimensions, such an approach may be computationally less intensive than if each individual object in the group was modelled separately.

After an object is grasped by a robot, the robot may determine how to place the object at a destination location (e.g., on a conveyor, cart, or pallet). The orientation of the object when placed at the destination location may impact, for example, the stability of the object when placed. Accordingly, placing objects at a destination location using a desired orientation (e.g., top side up, smallest side face up, long side face down, etc.) may be important to help ensure that the object is placed in a manner that ensures or facilitates stability of the object when placed at the destination location.

In some instances, the desired orientation of the object when placed at the destination location may depend, at least in part, on a particular task that the robot is performing. For example, when tasked with unloading boxes from a truck onto a conveyor, it may be desirable to place the longest dimension of the transferred boxes along the conveyor travel direction to facilitate stable placement of the boxes on the conveyor surface. In some instances, the desired orientation of the object may depend on one or more characteristics of the object. For example, if the object is a box that includes fragile components (e.g., glassware), the desired orientation may be to keep the box in the same orientation (e.g., top up) as it was oriented in the stack to avoid breaking its contents (e.g., by flipping it sideways or upside down). Determining whether an object should be placed top up, for example, due to it containing fragile contents, may be performed in any suitable way. For instance, one or more prototypes associated with the object may include information about the object that may be used to determine that the object should be placed top up. In some embodiments, information about the contents of the object may be determined, at least in part, based on a label (e.g., a barcode, a product label, etc.) on the object, and a determination that the object should be placed in a top up orientation may be based on identifying the label. Information about the contents of the object may also be used in some embodiments to change one or more operating parameters (e.g., arm speed, arm acceleration) of the robot.

In some embodiments, multiple of the above factors (or additional factors) may be taken into consideration when determining a desired orientation of an object to be placed at a destination location by a robot. For instance, although it may generally be desirable to place an object on a conveyor with its longest dimension aligned with the conveyor travel direction and its bottom face parallel with the conveyor plane, when the object includes fragile contents and/or if the object has an uneven weight distribution, an orientation other than long side down (e.g., a top up orientation) on the conveyor may be preferable. In some instances, a top up orientation of the object may be achieved while also rotating the object such that the bottom surface of the object is oriented to facilitate stability on the conveyor surface (e.g., by placing the longest of the bottom surface dimensions along the length of a conveyor surface).

In a single-pick operation, the single grasped object may be oriented (e.g., by movement of the robotic arm) based, at least in part, on the desired orientation. For example, the robot may determine a trajectory that results in the object arriving at the destination location in the desired orientation. As described herein, the trajectory may also be determined, at least in part, to avoid collisions with other objects in the environment of the robot (e.g., truck walls, other objects, a conveyor). The orientation of the grasped object in the gripper of the robot may be included in the determined trajectory to ensure that the object arrives at the destination location in the desired orientation and that any constraints (e.g., keeping the object with a top up orientation during the trajectory) associated with the trajectory are satisfied.

In the multi-pick operations described herein, the group of grasped objects may be oriented similarly as in a single-pick operation (e.g., by movement of the robotic arm) based, at least in part, on the desired orientation such that the group of objects arrives at the destination location in the desired orientation. However, because multiple objects are grasped together in a multi-pick operation, all of the grasped objects in the group are reoriented together, such that the first object in the group being placed may be in the desired orientation. In practice, because the multi-pick grasping process may be constrained to pick objects that have their longest dimension in the stack oriented similarly, as discussed above, rotating the group of objects to the desired orientation of one of the grasped objects in the group may also rotate the other grasped objects in the group into their desired orientation for placement. Stated differently, rotating the group of grasped objects such that one of the objects in the group has its longest dimension along the length of the conveyor may result, in many cases, to having the remaining objects in the group be oriented similarly with respect to the conveyor direction without having to rotate the gripper pose after placing the first object in the group and prior to placement of the next object in the group.

Unlike a single-pick operation in which a single object is placed on a conveyor or other structure at the destination location, in a multi-pick operation, multiple objects must be released from the gripper such that each is placed in a stable manner (e.g., by eliminating or reducing overhang of the placed objects relative to a conveyor surface). As described herein, a robotic device may be configured to enable actuation of individual suction cups of the gripper, which enables for all objects in a group to be released simultaneously (by turning off suction to all cups) or sequentially (by turning off suction to only a portion of the cups at a time). The manner in which objects (e.g., boxes) are placed on a conveyor may be important to enable a scanner to successfully scan objects as they are transported by the conveyor. For instance, it may be desirable to have objects separated on the conveyor (such that the sides of the objects are visible to a scanner) and oriented in a way that objects are stable (e.g., won't fall over) while being transported.

One technique to ensure that all of the grasped objects in a multi-pick operation are placed in a manner that minimizes overhang of the objects on a conveyor may be to center each of the placed objects on the center of the conveyor with their longest dimension parallel to the travel direction of the conveyor. However, such an approach may not be the fastest way to place multiple objects in a grasped group on the conveyor. Additionally, it may not be necessary to place all of the objects in this manner if all of the objects in the group can be placed in a way that they are not located too close to the edge of the conveyor.

Figure 8A:
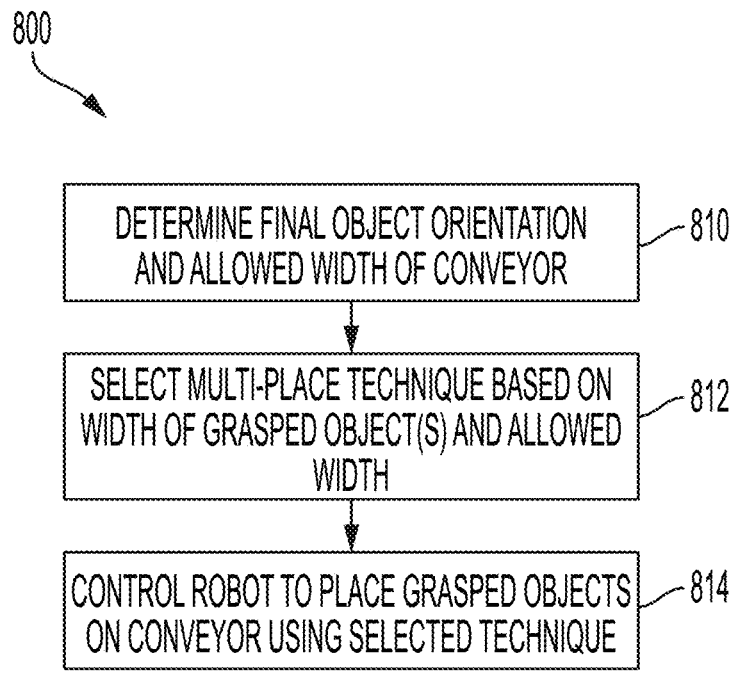
FIG. 8A is a flowchart of a process for placing multiple grasped objects on a conveyor, according to an illustrative embodiment of the invention.

FIG. 8A illustrates a process 800 for controlling a robot to perform a "multi-place" operation, in which multiple objects grasped by a gripper of the robot are placed on a conveyor using a particular technique, in accordance with some embodiments of the present disclosure. Process 800 begins in act 810, where the final object orientation of the object(s) grasped by the gripper of the robot and the allowed width of the conveyor is determined. For instance, the allowed width of the conveyor measurement may be provided as input to the robot by an operator prior to beginning pick-and-place operations with the robot. It should be appreciated that the allowed width of the conveyor may be less than the actual width dimension of the conveyor to ensure that objects are not placed too close to the edge of the conveyor (e.g., there may be a tolerance amount on each edge of the conveyor that is not included in the allowable width of the conveyor). As described herein, it may be desirable in some embodiments to place an object on the conveyor with its longest dimension along the travel direction of the conveyor. The final object orientation determined in act 810 may represent the orientation of the object prior to placement on the conveyor. Process 800 then proceeds to act 812, where a multi-place technique is selected based, at least in part, on the allowed width of the conveyor and the width of the grasped objects in the group when oriented in the final object orientation. As described above, in some embodiments, the group of grasped objects may be modelled as a volume that encloses all of the objects in the group, and the modelled volume may be used, at least in part, to determine an arm trajectory of the robot. In some embodiments, the modelled volume may also be used, at least in part, to determine how to place the objects on a conveyor, as described in more detail below. After selecting a multi-place technique, process 800 proceeds to act 814, where the robot is controlled to place the grasped objects in the group on the conveyor using the selected multi-place technique.

Figure 8B:
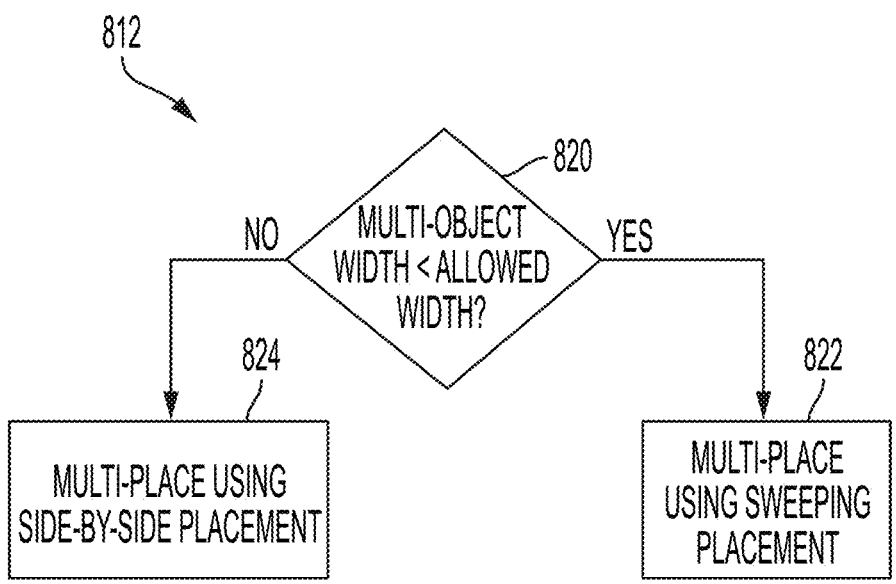
FIG. 8B is a flowchart of a process for selecting a multi-place technique, according to an illustrative embodiment of the invention.

In some embodiments, a selection between two multi-place techniques may be made based on whether the width of the group of grasped objects is less than or greater than the allowed width of the conveyor. It should be appreciated, however, that robots configured in accordance with the techniques described herein may select from among any suitable number of multi-place techniques, and the example of selecting from among two techniques is provided merely for example. FIG. 8B illustrates a decision process for act 812 of process 800 to determine whether to select a "sweeping" placement technique or a "side-by-side" placement technique when placing multiple objects on a conveyor, in accordance with some embodiments.

As shown in FIG. 8B, in act 820, it may be decided whether the width of the group of objects in its final orientation is less than the allowed width of the conveyor. When it is determined that the group of objects in its final orientation has a width less than the allowed width of the conveyor (i.e., that all grasped objects would fit within the allowed width if placed side by side), the process of FIG. 8B proceeds to act 822, where a "sweeping" multi-place technique is selected. In the sweeping multi-place technique, the gripper is arranged relative to the conveyor such that the group of grasped objects is centered over the conveyor. The first object is placed on the conveyor while the gripper is controlled to move opposite the conveyor motion, then the next object is placed on the conveyor. In the example of placing two objects using the sweeping technique, the two objects are placed on the conveyor, one behind the other. Although it may be possible for the robot to place multiple objects in the same configuration (one behind the other) on the conveyor without moving the gripper opposite the conveyor motion direction (e.g., by waiting until the first object has moved a sufficient distance along the conveyor before placing the next object), performing multi-place using the sweeping technique may improve the speed at which objects are placed, at least in part, because use of such a technique does not rely on how fast the conveyor is moving the objects after they are placed on the conveyor.

When it is determined in act 820 that the width of the group of grasped objects is not less than the allowed width of the conveyor, the process of FIG. 8B proceeds to act 824, where a "side-by-side" multi-place technique is selected. In the side-by-side multi-place technique, each object is placed within the allowed width of the conveyor by moving the gripper both opposite of the conveyor motion direction and laterally along the width of the conveyor to ensure that all of the objects in the group fit within the allowed width of the conveyor when placed. In some instances, performing a sweeping multi-place technique compared to a side-by-side multi-place technique may be preferred as it may enable the robot to place the multiple grasped objects in the group more quickly, thereby increasing the throughput of the robot for performing pick-and-place operations.

Figure 9A:
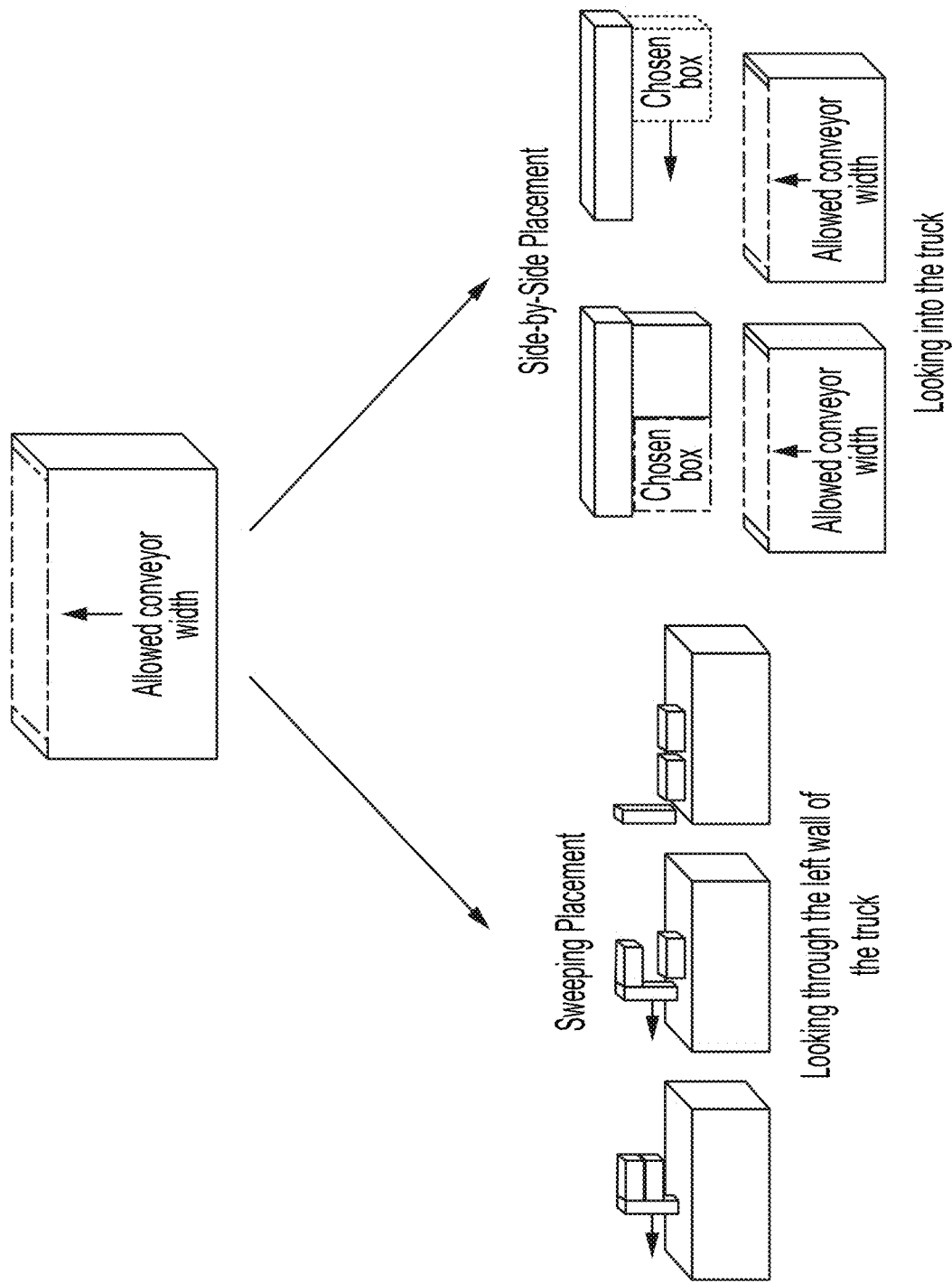
FIG. 9A schematically illustrates a process for selecting a multi-place technique for placing multiple grasped objects on a conveyor, according to an illustrative embodiment of the invention.

FIG. 9A schematically illustrates selection of a multi-place technique for placing multiple grasped objects on a conveyor, in accordance with some embodiments of the present disclosure. As described above, when a sweeping multi-place technique is selected, the gripper need only be moved in a direction opposite to conveyor motion to place the objects. In a side-by-side placement, the gripper is moved both in a direction opposite to conveyor motion and also laterally along the allowed conveyor width to place the objects to ensure that all objects in the group are placed within the allowed width of the conveyor.

Figure 9B:
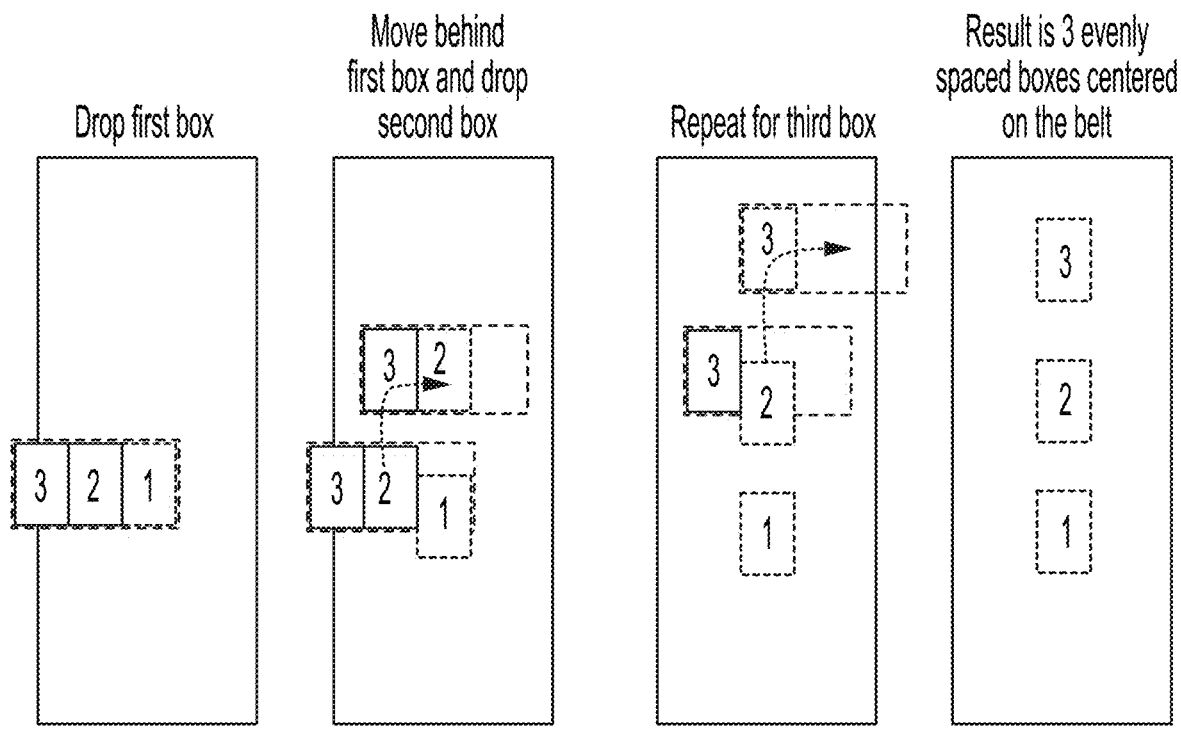
FIG. 9B schematically illustrates a process for performing a side-by-side placement technique, according to an illustrative embodiment of the invention.

FIG. 9B schematically illustrates a side-by-side multi-place operation using continuous trajectories in accordance with some embodiments of the present disclosure. As described herein, although multiple objects grasped by a gripper can be placed on a conveyor by waiting a particular amount of time for the conveyor to move a placed object out of the way before placing a next object, it may be faster to control the robot arm to move the gripper in a direction opposite the travel of the conveyor to speed placing of the objects on the conveyor. As shown in FIG. 9B, a process of side-to-side placement of objects on a conveyor may proceed using the following steps:

(1) The gripper is positioned to place a first object in a group of grasped objects. The gripper releases the first object, which starts moving with the conveyor belt away from the gripper position.
(2) The gripper position needed to drop the next grasped object directly behind the first object is determined. In some embodiments, both the time it will take to move the gripper to that position and the distance that the previous object will have moved due to the conveyor belt speed are considered. In the determined gripper position the next object may be positioned directly behind the first object (with some determined spacing) in a minimum possible time.
(3) The gripper is controlled to move into the determined gripper position for the next box placement in such a way that avoids collisions between any of the grasped objects and the objects already placed on the conveyor. Once in position, the next object is placed on the conveyor. To avoid collisions with the previously placed object, the gripper may first be moved back until the next object to be placed clear the back of the object that was previously placed, and then the gripper may be moved sideways (perpendicular to the travel direction of the conveyor). In some embodiments, the action of moving the gripper position between placements of objects is achieved in a smooth motion that minimizes the time between the first and subsequent object placements.
(4) The process repeats from step 2 until all grasped boxes are placed on the conveyor.

As described above, when placing objects on a conveyor it is often desirable to place objects with their longest dimension along the travel of the conveyor belt and their largest face down (also referred to herein as "lengthwise, large face down"). However, in some instances placing at least some objects on the conveyor in a different orientation may increase the number of objects that can be placed on the conveyor over a window of time (e.g., cases per hour). In some embodiments, lengthwise, large face down may be a default orientation for placing objects on a conveyor, and a different orientation may be used based, at least in part, on characteristics of the grasped object including, but not limited to, the size, shape, and/or weight of the object. For example, the object may be placed on the conveyor in an orientation that may be different than the default orientation (e.g., lengthwise, large face down) in a way that may increase the speed of placing objects on the conveyor without substantially increasing the risk that the object will fall off the conveyor once placed.

Figure 9C:
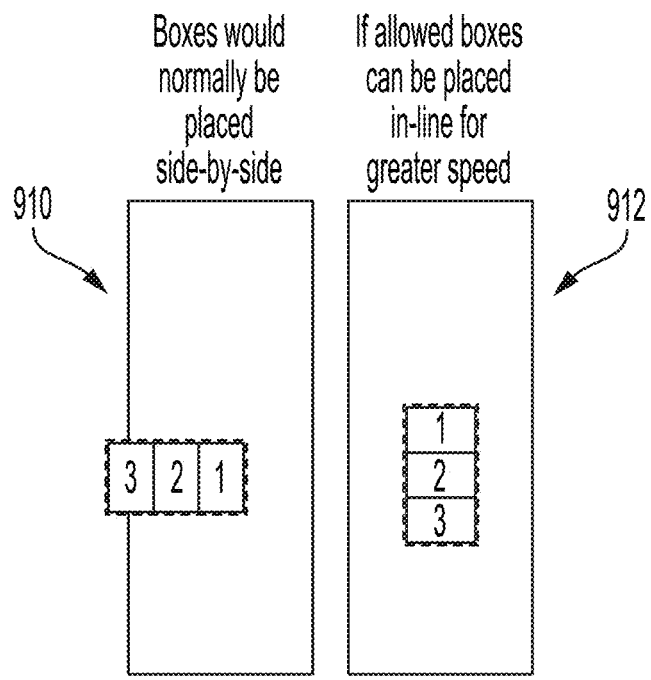
FIG. 9C schematically illustrates two scenarios for selecting a multi-place technique for placing multiple grasped objects on a conveyor, according to an illustrative embodiment of the invention.

FIG. 9C schematically illustrates an example of this process. As shown, scenario 910 illustrates a default placement operation in which multiple grasped objects are placed on the conveyor using a side-by-side placement. As described above, in a side-by-side placement a first object is placed on the conveyor, the gripper is moved to a new location both away from the direction of travel of the conveyor and laterally prior to placing a second object in the group. In scenario 910 a third object is placed after moving the gripper again after placement of the second object. FIG. 9C also shows scenario 912 in which objects are placed on the conveyor in an orientation other than lengthwise, large face down (e.g., a default orientation) increasing the speed of placing objects on the conveyor. Rather than placing the objects using side-by-side placement as in scenario 910, the speed of placing the objects on the conveyor is increased in scenario 912 by using in-line placement. Although the in-line placement shown in scenario 912 does not result in the longest dimension of the objects being oriented along the travel of the conveyor, placement of the three objects is sped up relative to scenario 910 due to the gripper not having the change positions (or only moving in the direction opposite of the travel of the conveyor) between placing objects on the conveyor.

In some embodiments, a default placement for placing objects on a conveyor (e.g., placed in center of conveyor belt in lengthwise, large face down orientation) may altered when two or more dimensions of the object are similar within some tolerance. For instance, the tolerance may be determined by one or more features of the object including, but not limited to, the size of the object and/or the aspect ratio of at least two dimensions of the object. In some embodiments, the default placement may be altered based a ratio of the shortest to second shortest dimension of the object being greater than a tolerance for stability. The ratio being greater than the tolerance for stability may suggest that the object placed with a dimension other than its shortest dimension facing up will still be stable. In some embodiments, the default placement may be altered based on a combination of the aforementioned factors or other factors.

In some embodiments, altering a default placement for placing objects with the robotic device includes altering one or both of changing a place type (e.g., orienting the object differently such that the gripper is facing a different direction-such as from a face place (gripper oriented vertically) to a top place (gripper oriented horizontally)) or changing the orientation of the group of grasped objects (e.g., rotating the group of objects such that they can be placed in-line, an example of which is shown in scenario 912 of FIG. 9C).

When the arm of the robot is outstretched further from the base of the robot, the motors in the arm need to work harder to hold the arm up due the weight of the arm and the grasped objects. However, outstretching the arm further from the base of the robot also facilitates a longer pull-back motion of the gripper when placing multiple objects on the conveyor (e.g., as described in connection with FIG. 9B), which increases the speed of object placement. Some embodiments of the present disclosure implement an arm extension limit to determine an arm extension for the robot that results in a fast overall placement of the objects on the conveyor given the number and characteristics of the objects being grasped and placed by the robot. In some embodiments, when determining an arm extension for the robot a combination of one or more of the following criteria are used: the force needed to hold the arm and the payload at various arm extensions; the size and positioning of grasped objects and the desired spacing of the objects on the conveyor; and the speed of the conveyor belt (e.g., the greater the speed of the conveyor belt, the more the belt will help move the objects away from the gripper position where objects are released). In some embodiments, the lengths of the grasped objects in the orientations they will be placed may be added to estimate how much spacing is needed on the conveyor to place all of the grasped objects in the group. The layout of placing the objects on the conveyor may be determined in advance of releasing any of the objects onto the conveyor, and the layout may be used to determine where to position the first box released from the gripper.

Figure 9D:
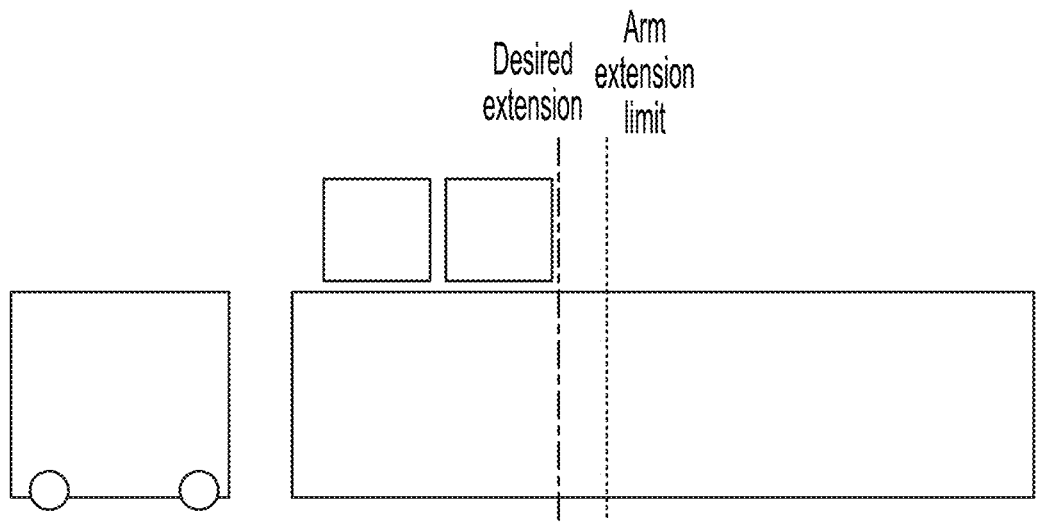
FIG. 9D schematically illustrates a process for determining an arm extension of a robot, according to an illustrative embodiment of the invention.
Figure 9D:
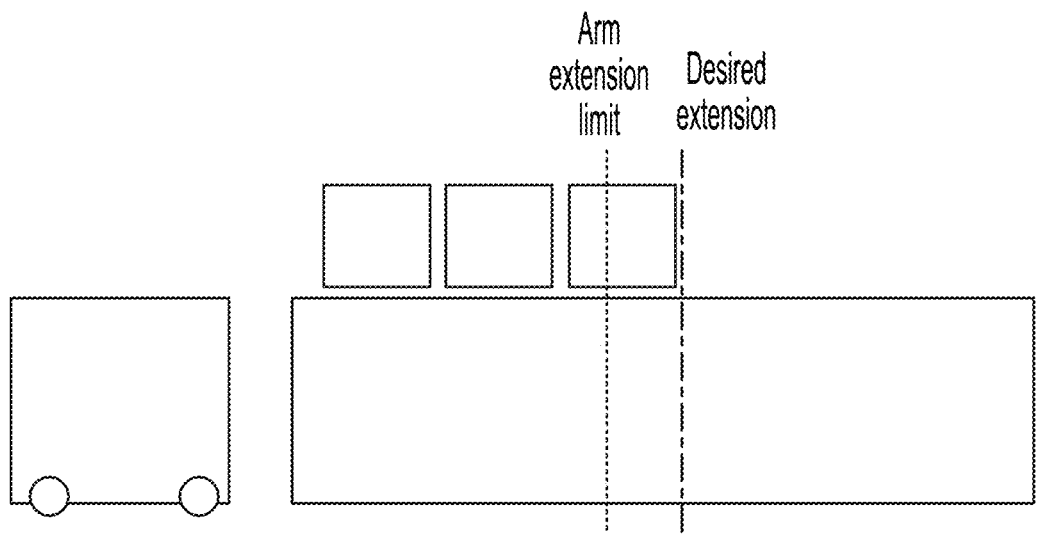

Once the desired arm extension is determined it may be bounded by the maximum allowed arm extension given the force requirements on the robot. FIG. 9D illustrates an example of selecting an arm extension bounded by an arm extension limit in accordance with some embodiments. In the top portion of FIG. 9D, the desired arm extension (e.g., calculated using the process described above) is less than the arm extension limit, and as such the desired arm extension is used when transitioning from the pick to the place of a group of objects. In the bottom portion of FIG. 9D, the desired arm extension is greater than the arm extension limit. In this situation, the arm extension used when transitioning from the pick to the place of a group of objects is set at the arm extension limit.

Figure 10:
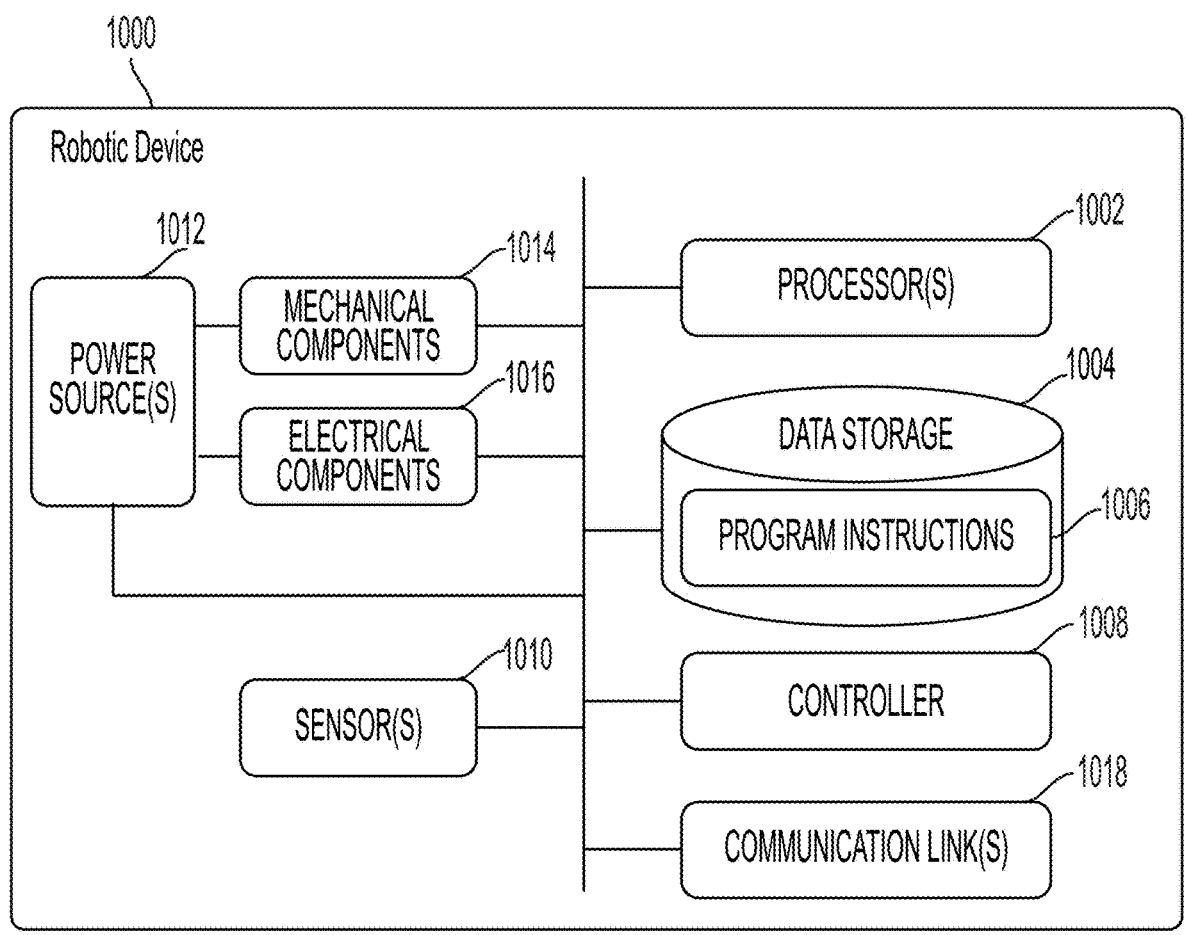
FIG. 10 illustrates an example configuration of a robotic device, according to an illustrative embodiment of the invention.

FIG. 10 illustrates an example configuration of a robotic device 1000, according to an illustrative embodiment of the invention. An example implementation involves a robotic device configured with at least one robotic limb, one or more sensors, and a processing system. The robotic limb may be an articulated robotic appendage including a number of members connected by joints. The robotic limb may also include a number of actuators (e.g., 2-5 actuators) coupled to the members of the limb that facilitate movement of the robotic limb through a range of motion limited by the joints connecting the members. The sensors may be configured to measure properties of the robotic device, such as angles of the joints, pressures within the actuators, joint torques, and/or positions, velocities, and/or accelerations of members of the robotic limb(s) at a given point in time. The sensors may also be configured to measure an orientation (e.g., a body orientation measurement) of the body of the robotic device (which may also be referred to herein as the "base" of the robotic device). Other example properties include the masses of various components of the robotic device, among other properties. The processing system of the robotic device may determine the angles of the joints of the robotic limb, either directly from angle sensor information or indirectly from other sensor information from which the joint angles can be calculated. The processing system may then estimate an orientation of the robotic device based on the sensed orientation of the base of the robotic device and the joint angles.

An orientation may herein refer to an angular position of an object. In some instances, an orientation may refer to an amount of rotation (e.g., in degrees or radians) about three axes. In some cases, an orientation of a robotic device may refer to the orientation of the robotic device with respect to a particular reference frame, such as the ground or a surface on which it stands. An orientation may describe the angular position using Euler angles, Tait-Bryan angles (also known as yaw, pitch, and roll angles), and/or Quaternions. In some instances, such as on a computer-readable medium, the orientation may be represented by an orientation matrix and/or an orientation quaternion, among other representations.

In some scenarios, measurements from sensors on the base of the robotic device may indicate that the robotic device is oriented in such a way and/or has a linear and/or angular velocity that requires control of one or more of the articulated appendages in order to maintain balance of the robotic device. In these scenarios, however, it may be the case that the limbs of the robotic device are oriented and/or moving such that balance control is not required. For example, the body of the robotic device may be tilted to the left, and sensors measuring the body's orientation may thus indicate a need to move limbs to balance the robotic device; however, one or more limbs of the robotic device may be extended to the right, causing the robotic device to be balanced despite the sensors on the base of the robotic device indicating otherwise. The limbs of a robotic device may apply a torque on the body of the robotic device and may also affect the robotic device's center of mass. Thus, orientation and angular velocity measurements of one portion of the robotic device may be an inaccurate representation of the orientation and angular velocity of the combination of the robotic device's body and limbs (which may be referred to herein as the "aggregate" orientation and angular velocity).

In some implementations, the processing system may be configured to estimate the aggregate orientation and/or angular velocity of the entire robotic device based on the sensed orientation of the base of the robotic device and the measured joint angles. The processing system has stored thereon a relationship between the joint angles of the robotic device and the extent to which the joint angles of the robotic device affect the orientation and/or angular velocity of the base of the robotic device. The relationship between the joint angles of the robotic device and the motion of the base of the robotic device may be determined based on the kinematics and mass properties of the limbs of the robotic devices. In other words, the relationship may specify the effects that the joint angles have on the aggregate orientation and/or angular velocity of the robotic device. Additionally, the processing system may be configured to determine components of the orientation and/or angular velocity of the robotic device caused by internal motion and components of the orientation and/or angular velocity of the robotic device caused by external motion. Further, the processing system may differentiate components of the aggregate orientation in order to determine the robotic device's aggregate yaw rate, pitch rate, and roll rate (which may be collectively referred to as the "aggregate angular velocity").

In some implementations, the robotic device may also include a control system that is configured to control the robotic device on the basis of a simplified model of the robotic device. The control system may be configured to receive the estimated aggregate orientation and/or angular velocity of the robotic device, and subsequently control one or more jointed limbs of the robotic device to behave in a certain manner (e.g., maintain the balance of the robotic device).

In some implementations, the robotic device may include force sensors that measure or estimate the external forces (e.g., the force applied by a limb of the robotic device against the ground) along with kinematic sensors to measure the orientation of the limbs of the robotic device. The processing system may be configured to determine the robotic device's angular momentum based on information measured by the sensors. The control system may be configured with a feedback-based state observer that receives the measured angular momentum and the aggregate angular velocity, and provides a reduced-noise estimate of the angular momentum of the robotic device. The state observer may also receive measurements and/or estimates of torques or forces acting on the robotic device and use them, among other information, as a basis to determine the reduced-noise estimate of the angular momentum of the robotic device.

In some implementations, multiple relationships between the joint angles and their effect on the orientation and/or angular velocity of the base of the robotic device may be stored on the processing system. The processing system may select a particular relationship with which to determine the aggregate orientation and/or angular velocity based on the joint angles. For example, one relationship may be associated with a particular joint being between 0 and 90 degrees, and another relationship may be associated with the particular joint being between 91 and 180 degrees. The selected relationship may more accurately estimate the aggregate orientation of the robotic device than the other relationships.

In some implementations, the processing system may have stored thereon more than one relationship between the joint angles of the robotic device and the extent to which the joint angles of the robotic device affect the orientation and/or angular velocity of the base of the robotic device. Each relationship may correspond to one or more ranges of joint angle values (e.g., operating ranges). In some implementations, the robotic device may operate in one or more modes. A mode of operation may correspond to one or more of the joint angles being within a corresponding set of operating ranges. In these implementations, each mode of operation may correspond to a certain relationship.

The angular velocity of the robotic device may have multiple components describing the robotic device's orientation (e.g., rotational angles) along multiple planes. From the perspective of the robotic device, a rotational angle of the robotic device turned to the left or the right may be referred to herein as "yaw." A rotational angle of the robotic device upwards or downwards may be referred to herein as "pitch." A rotational angle of the robotic device tilted to the left or the right may be referred to herein as "roll." Additionally, the rate of change of the yaw, pitch, and roll may be referred to herein as the "yaw rate," the "pitch rate," and the "roll rate," respectively.

FIG. 10 illustrates an example configuration of a robotic device (or "robot") 1000, according to an illustrative embodiment of the invention. The robotic device 1000 represents an example robotic device configured to perform the operations described herein. Additionally, the robotic device 1000 may be configured to operate autonomously, semi-autonomously, and/or using directions provided by user(s), and may exist in various forms, such as a humanoid robot, biped, quadruped, or other mobile robot, among other examples. Furthermore, the robotic device 1000 may also be referred to as a robotic system, mobile robot, or robot, among other designations.

As shown in FIG. 10, the robotic device 1000 includes processor(s) 1002, data storage 1004, program instructions 1006, controller 1008, sensor(s) 1010, power source(s) 1012, mechanical components 1014, and electrical components 1016. The robotic device 1000 is shown for illustration purposes and may include more or fewer components without departing from the scope of the disclosure herein. The various components of robotic device 1000 may be connected in any manner, including via electronic communication means, e.g., wired or wireless connections. Further, in some examples, components of the robotic device 1000 may be positioned on multiple distinct physical entities rather on a single physical entity. Other example illustrations of robotic device 1000 may exist as well.

Processor(s) 1002 may operate as one or more general-purpose processor or special purpose processors (e.g., digital signal processors, application specific integrated circuits, etc.). The processor(s) 1002 can be configured to execute computer-readable program instructions 1006 that are stored in the data storage 1004 and are executable to provide the operations of the robotic device 1000 described herein. For instance, the program instructions 1006 may be executable to provide operations of controller 1008, where the controller 1008 may be configured to cause activation and/or deactivation of the mechanical components 1014 and the electrical components 1016. The processor(s) 1002 may operate and enable the robotic device 1000 to perform various functions, including the functions described herein.

The data storage 1004 may exist as various types of storage media, such as a memory. For example, the data storage 1004 may include or take the form of one or more computer-readable storage media that can be read or accessed by processor(s) 1002. The one or more computer-readable storage media can include volatile and/or nonvolatile storage components, such as optical, magnetic, organic or other memory or disc storage, which can be integrated in whole or in part with processor(s) 1002. In some implementations, the data storage 1004 can be implemented using a single physical device (e.g., one optical, magnetic, organic or other memory or disc storage unit), while in other implementations, the data storage 1004 can be implemented using two or more physical devices, which may communicate electronically (e.g., via wired or wireless communication). Further, in addition to the computer-readable program instructions 1006, the data storage 1004 may include additional data such as diagnostic data, among other possibilities.

The robotic device 1000 may include at least one controller 1008, which may interface with the robotic device 1000. The controller 1008 may serve as a link between portions of the robotic device 1000, such as a link between mechanical components 1014 and/or electrical components 1016. In some instances, the controller 1008 may serve as an interface between the robotic device 1000 and another computing device. Furthermore, the controller 1008 may serve as an interface between the robotic device 1000 and a user(s). The controller 1008 may include various components for communicating with the robotic device 1000, including one or more joysticks or buttons, among other features. The controller 1008 may perform other operations for the robotic device 1000 as well. Other examples of controllers may exist as well.

Additionally, the robotic device 1000 includes one or more sensor(s) 1010 such as force sensors, proximity sensors, motion sensors, load sensors, position sensors, touch sensors, depth sensors, ultrasonic range sensors, and/or infrared sensors, among other possibilities. The sensor(s) 1010 may provide sensor data to the processor(s) 1002 to allow for appropriate interaction of the robotic device 1000 with the environment as well as monitoring of operation of the systems of the robotic device 1000. The sensor data may be used in evaluation of various factors for activation and deactivation of mechanical components 1014 and electrical components 1016 by controller 1008 and/or a computing system of the robotic device 1000.

The sensor(s) 1010 may provide information indicative of the environment of the robotic device for the controller 1008 and/or computing system to use to determine operations for the robotic device 1000. For example, the sensor(s) 1010 may capture data corresponding to the terrain of the environment or location of nearby objects, which may assist with environment recognition and navigation, etc. In an example configuration, the robotic device 1000 may include a sensor system that may include a camera, RADAR, LIDAR, time-of-flight camera, global positioning system (GPS) transceiver, and/or other sensors for capturing information of the environment of the robotic device 1000. The sensor(s) 1010 may monitor the environment in real-time and detect obstacles, elements of the terrain, weather conditions, temperature, and/or other parameters of the environment for the robotic device 1000.

Further, the robotic device 1000 may include other sensor(s) 1010 configured to receive information indicative of the state of the robotic device 1000, including sensor(s) 1010 that may monitor the state of the various components of the robotic device 1000. The sensor(s) 1010 may measure activity of systems of the robotic device 1000 and receive information based on the operation of the various features of the robotic device 1000, such the operation of extendable legs, arms, or other mechanical and/or electrical features of the robotic device 1000. The sensor data provided by the sensors may enable the computing system of the robotic device 1000 to determine errors in operation as well as monitor overall functioning of components of the robotic device 1000.

For example, the computing system may use sensor data to determine the stability of the robotic device 1000 during operations as well as measurements related to power levels, communication activities, components that require repair, among other information. As an example configuration, the robotic device 1000 may include gyroscope(s), accelerometer(s), and/or other possible sensors to provide sensor data relating to the state of operation of the robotic device. Further, sensor(s) 1010 may also monitor the current state of a function that the robotic device 1000 may currently be operating. Additionally, the sensor(s) 1010 may measure a distance between a given robotic limb of a robotic device and a center of mass of the robotic device. Other example uses for the sensor(s) 1010 may exist as well.

Additionally, the robotic device 1000 may also include one or more power source(s) 1012 configured to supply power to various components of the robotic device 1000. Among possible power systems, the robotic device 1000 may include a hydraulic system, electrical system, batteries, and/or other types of power systems. As an example illustration, the robotic device 1000 may include one or more batteries configured to provide power to components via a wired and/or wireless connection. Within examples, components of the mechanical components 1014 and electrical components 1016 may each connect to a different power source or may be powered by the same power source. Components of the robotic device 1000 may connect to multiple power sources as well.

Within example configurations, any type of power source may be used to power the robotic device 1000, such as a gasoline and/or electric engine. Further, the power source(s) 1012 may charge using various types of charging, such as wired connections to an outside power source, wireless charging, combustion, or other examples. Other configurations may also be possible. Additionally, the robotic device 1000 may include a hydraulic system configured to provide power to the mechanical components 1014 using fluid power. Components of the robotic device 1000 may operate based on hydraulic fluid being transmitted throughout the hydraulic system to various hydraulic motors and hydraulic cylinders, for example. The hydraulic system of the robotic device 1000 may transfer a large amount of power through small tubes, flexible hoses, or other links between components of the robotic device 1000. Other power sources may be included within the robotic device 1000.

Mechanical components 1014 can represent hardware of the robotic device 1000 that may enable the robotic device 1000 to operate and perform physical functions. As a few examples, the robotic device 1000 may include actuator(s), extendable leg(s), arm(s), wheel(s), one or multiple structured bodies for housing the computing system or other components, and/or other mechanical components. The mechanical components 1014 may depend on the design of the robotic device 1000 and may also be based on the functions and/or tasks the robotic device 1000 may be configured to perform. As such, depending on the operation and functions of the robotic device 1000, different mechanical components 1014 may be available for the robotic device 1000 to utilize. In some examples, the robotic device 1000 may be configured to add and/or remove mechanical components 1014, which may involve assistance from a user and/or other robotic device.

The electrical components 1016 may include various components capable of processing, transferring, providing electrical charge or electric signals, for example. Among possible examples, the electrical components 1016 may include electrical wires, circuitry, and/or wireless communication transmitters and receivers to enable operations of the robotic device 1000. The electrical components 1016 may interwork with the mechanical components 1014 to enable the robotic device 1000 to perform various operations. The electrical components 1016 may be configured to provide power from the power source(s) 1012 to the various mechanical components 1014, for example. Further, the robotic device 1000 may include electric motors. Other examples of electrical components 1016 may exist as well.

In some implementations, the robotic device 1000 may also include communication link(s) 1018 configured to send and/or receive information. The communication link(s) 1018 may transmit data indicating the state of the various components of the robotic device 1000. For example, information read in by sensor(s) 1010 may be transmitted via the communication link(s) 1018 to a separate device. Other diagnostic information indicating the integrity or health of the power source(s) 1012, mechanical components 1014, electrical components 1016, processor(s) 1002, data storage 1004, and/or controller 1008 may be transmitted via the communication link(s) 1018 to an external communication device.

In some implementations, the robotic device 1000 may receive information at the communication link(s) 1018 that is processed by the processor(s) 1002. The received information may indicate data that is accessible by the processor(s) 1002 during execution of the program instructions 1006, for example. Further, the received information may change aspects of the controller 1008 that may affect the behavior of the mechanical components 1014 or the electrical components 1016. In some cases, the received information indicates a query requesting a particular piece of information (e.g., the operational state of one or more of the components of the robotic device 1000), and the processor(s) 1002 may subsequently transmit that particular piece of information back out the communication link(s) 1018.

In some cases, the communication link(s) 1018 include a wired connection. The robotic device 1000 may include one or more ports to interface the communication link(s) 1018 to an external device. The communication link(s) 1018 may include, in addition to or alternatively to the wired connection, a wireless connection. Some example wireless connections may utilize a cellular connection, such as CDMA, EVDO, GSM/GPRS, or 4G telecommunication, such as WiMAX or LTE. Alternatively or in addition, the wireless connection may utilize a Wi-Fi connection to transmit data to a wireless local area network (WLAN). In some implementations, the wireless connection may also communicate over an infrared link, radio, Bluetooth, or a near-field communication (NFC) device.

A number of implementations have been described. Nevertheless, it will be understood that various modifications may be made without departing from the spirit and scope of the disclosure.

The invention claimed is:

1. A method of grasping multiple objects by a suction-based gripper of a mobile robot, the method comprising:
   determining, by a computing device, one or more candidate groups of objects to grasp by the suction-based gripper of the mobile robot, each of the one or more candidate groups of objects including a plurality of objects;
   determining, by the computing device, a grasp quality score for each of the one or more candidate groups of objects;
   grasping, by the suction-based gripper of the mobile robot, all objects in a candidate group of objects of the one or more candidate groups of objects based, at least in part, on the grasp quality score determined for the candidate group of objects;
   determining, by the computing device, a target object to grasp by the suction-based gripper of the mobile robot, wherein:
      each of the one or more candidate groups of objects includes the target object,
      a plurality of non-target objects are arranged in a vicinity of the target object, and
      determining one or more candidate groups of objects to grasp by the suction-based gripper of the mobile robot comprises:
         determining, by the computing device, to exclude a non-target object from a candidate group when the non-target object satisfies at least one criterion; and
         including in the one or more candidate groups of objects only non-target objects that are not excluded.

2. The method of claim 1, wherein the at least one criterion includes a face of the non-target object being misaligned by a threshold amount from a face of the target object.

3. The method of claim 2, further comprising:
   defining an alignment window based on the face of the target object; and
   determining the non-target object is misaligned by a threshold amount from the face of the target object when at least one corner of the face of the non-target object is outside of the alignment window.

4. The method of claim 3, wherein defining the alignment window is further based on the face of the non-target object.

5. The method of claim 1, wherein the at least one criterion includes at least one dimension of the non-target object being above a threshold dimension.

6. The method of claim 1, wherein the at least one criterion includes at least one dimension of the non-target object being unknown.

7. The method of claim 1, wherein the at least one criterion includes the non-target object having a different longest dimension than a longest dimension of the target object.

8. The method of claim 1, wherein the at least one criterion includes the non-target object having a dependency on at least one other non-target object determined to be excluded from a candidate group.

9. The method of claim 1, wherein determining a grasp quality score for each of the one or more candidate groups of objects comprises:
   for each object in the candidate group, using a physical model of object-gripper interaction to evaluate a grasp quality of the object-gripper interaction; and
   determining the grasp quality score based on the grasp quality determined for each of the objects in the candidate group.

10. The method of claim 1, further comprising:
   determining, by the computing device, for each object in the grasped candidate group of objects, a grasp quality; and releasing one or more objects from the suction-based gripper based, at least in part, on the grasp quality for at least one object being below a threshold grasp quality.

11. The method of claim 10, wherein releasing one or more objects from the suction-based gripper comprises releasing each object having a grasp quality below the threshold grasp quality and/or releasing a first object having a grasp quality above the threshold grasp quality and being located adjacent to a second object having a grasp quality below the threshold grasp quality.

12. The method of claim 1, further comprising:
determining, by the computing device, a depth of the plurality of objects within each of the one or more candidate groups of objects,
wherein grasping all objects in a candidate group of objects of the one or more candidate groups of objects is further based, at least in part, on the depth determined for each of the one or more candidate groups of objects.

13. The method of claim 12, wherein determining the depth of the plurality of objects within each of the one or more candidate groups of objects comprises:
modeling dependencies between objects in a stack of objects as a directed acyclic graph, wherein each node of the directed acyclic graph represents an object in the stack and each directed edge between nodes in the directed acyclic graph represents an amount of physical blocking between the nodes;
determining the depth of each of the plurality of objects in a candidate group of objects based as a longest path between an object with no blocking by other objects in the stack and the node in the directed acyclic graph representing the object; and
determining the depth of the plurality of objects within a candidate group of objects based on a sum of the depths of each of the objects in the candidate group.

14. The method of claim 1, further comprising:
determining, by the computing device, an object placement property for at least one object of the plurality of objects within each of the one or more candidate groups of objects,
wherein grasping all objects a candidate group of objects of the one or more candidate groups of objects is further based, at least in part, on the object placement property determined for each of the one or more candidate groups of objects.

15. The method of claim 1, wherein the suction-based gripper includes a plurality of suction cups, and the method further comprises:
assigning a seal confidence to each of the plurality of suction cups; and
controlling operation of each of the plurality of suction cups based, at least in part, on the assigned seal confidence for the suction cup.

16. The method of claim 15, wherein controlling operation of each of the plurality of suction cups comprises controlling a leak detection process and/or a cup retrying process.

17. The method of claim 15, wherein assigning a seal confidence to each of the plurality of suction cups comprises:
assigning a first confidence value to a suction cup when an inner diameter but not an outer diameter of the suction cup is within a face surface of an object to be grasped; and
assigning a second confidence value to the suction cup when both the inner diameter and the outer diameter of the suction cup is within the face surface of the object to be grasped.

18. A mobile robot, comprising:
a suction-based gripper; and
at least one computing device programmed to:
determine one or more candidate groups of objects to grasp by the suction-based gripper, each of the one or more candidate groups of objects including a plurality of objects;
determine an object placement property for at least one object of the plurality of objects within each of the one or more candidate groups of objects;
determine a grasp quality score for each of the one or more candidate groups of objects; and
grasp, by the suction-based gripper, all objects in a candidate group of objects of the one or more candidate groups of objects based, at least in part, on the grasp quality score determined for each of the one or more candidate groups of objects and the object placement property determined for each of the one or more candidate groups of objects.

19. The mobile robot of claim 18, wherein
the suction-based gripper includes a plurality of suction cups, and
the at least one computing device is further programmed to:
assign a seal confidence to each of the plurality of suction cups; and
control operation of each of the plurality of suction cups based, at least in part, on the assigned seal confidence for the suction cup.

20. A method of grasping multiple objects by a suction-based gripper of a mobile robot, the method comprising:
determining, by a computing device, one or more candidate groups of objects to grasp by the suction-based gripper of the mobile robot, each of the one or more candidate groups of objects including a plurality of objects;
determining, by the computing device, a grasp quality score for each of the one or more candidate groups of objects;
grasping, by the suction-based gripper of the mobile robot, all objects in a candidate group of objects of the one or more candidate groups of objects based, at least in part, on the grasp quality score determined for the candidate group of objects;
determining, by the computing device, for each object in the grasped candidate group of objects, a grasp quality; and
releasing one or more objects from the suction-based gripper based, at least in part, on the grasp quality for at least one object being below a threshold grasp quality, wherein releasing one or more objects from the suction-based gripper comprises releasing each object having a grasp quality below the threshold grasp quality and/or releasing a first object having a grasp quality above the threshold grasp quality and being located adjacent to a second object having a grasp quality below the threshold grasp quality.

* * * * *